United States Patent
Higuchi

(10) Patent No.: US 7,982,912 B2
(45) Date of Patent: Jul. 19, 2011

(54) COLOR SIGNAL CONVERSION METHOD AND APPARATUS, AND METHOD AND APPARATUS FOR GENERATING MAPPING PARAMETERS

(75) Inventor: Shugo Higuchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 547 days.

(21) Appl. No.: 12/114,495

(22) Filed: May 2, 2008

(65) Prior Publication Data

US 2008/0291476 A1 Nov. 27, 2008

(30) Foreign Application Priority Data

May 21, 2007 (JP) ................................. 2007-134581

(51) Int. Cl.
G06F 15/00 (2006.01)
(52) U.S. Cl. .......... 358/1.9; 358/518; 358/520; 345/604
(58) Field of Classification Search .................. 358/1.9, 358/518, 520; 382/162, 167; 345/603, 604
See application file for complete search history.

(56) References Cited

U.S. PATENT DOCUMENTS

| | | | | |
|---|---|---|---|---|
| 5,583,666 A | * | 12/1996 | Ellson et al. .................. 358/518 |
| 5,857,063 A | * | 1/1999 | Poe et al. ....................... 358/1.9 |
| 2003/0164968 A1 | * | 9/2003 | Iida ................................ 358/1.9 |
| 2005/0146734 A1 | * | 7/2005 | Stokes et al. .................. 358/1.9 |
| 2008/0043268 A1 | * | 2/2008 | Bang et al. .................... 358/1.9 |

FOREIGN PATENT DOCUMENTS

| | | |
|---|---|---|
| JP | 2001-094799 | 4/2001 |
| JP | 2002-033929 | 1/2002 |
| JP | 2002-152536 | 5/2002 |
| WO | 2007/022240 A | 2/2007 |

* cited by examiner

Primary Examiner — Kimberly A Williams
(74) Attorney, Agent, or Firm — Cowan, Liebowitz & Latman, P.C.

(57) ABSTRACT

A color signal conversion apparatus for converting a color signal of an input gamut to a color signal of an output gamut is provided. First, a target gamut for gamut mapping carried out on the input gamut is set, after which an evaluation function is determined for evaluating the difference between the target gamut and the results of gamut mapping performed on the input gamut using initialized mapping parameters. Then, the mapping parameters are determined based on the evaluation function so that the difference is minimum. The color signal of the input gamut is then mapped to the output gamut based on the determined mapping parameters and constraining conditions. This makes it possible to achieve favorable gamut mapping based on optimal mapping parameters that have been determined automatically.

11 Claims, 19 Drawing Sheets

| R VALUE STEPS : 0, 32, 64, ..., 224, 255 |
|---|
| G VALUE STEPS : 0, 32, 64, ..., 224, 255 |
| B VALUE STEPS : 0, 32, 64, ..., 224, 255 |
| L*a*b* COORDINATES OF GRID (0, 0, 0) : (30, 0, −2) |
| L*a*b* COORDINATES OF GRID (0, 0, 32) : (31, 2, −9) |
| ... |
| L*a*b* COORDINATES OF GRID (0, 0, 8) : (34, 18, −33) |
| L*a*b* COORDINATES OF GRID (0, 1, 0) : (34, −8, 0) |
| ... |
| L*a*b* COORDINATES OF GRID (8, 8, 7) : (90, −4, 12) |
| L*a*b* COORDINATES OF GRID (8, 8, 8) : (92, 0, 0) |

COLOR SIGNAL CONVERSION METHOD AND APPARATUS, AND METHOD AND APPARATUS FOR GENERATING MAPPING PARAMETERS

BACKGROUND OF THE INVENTION

1. Field of the Invention

The present invention relates to a color signal conversion method and apparatus for converting a color signal of an input gamut to a color signal of an output gamut, and to a method and apparatus for generating mapping parameters.

2. Description of the Related Art

Gamut mapping is a technique that associates a certain gamut with another gamut in a uniform calorimetric system, and is known as a conventional technique for color reproduction aimed at achieving perceptual matching between images when utilizing paper types, display media, and the like that have different gamuts. A technique by which complex map conversion from a single dimension to three dimensions is carried out over plural stages (for example, see Japanese Patent Laid-Open No. 2001-94799) and a technique that realizes a gamut map by expressing gradation representing color change as a curve (for example, see Japanese Patent Laid-Open No. 2002-33929) have been proposed as such types of gamut mapping techniques.

Regarding the yellow (Y) component in particular, while there is a trend that favors pure colors for use in color printers, cyan (C) and magenta (M) components will contaminate and muddy the Y component if hue deviation occurs with the gamut map. Such muddied color is prominent in the high brightness range of the Y component, and is perceptually apparent as a change in the hue. A technique that achieves perceptually favorable color reproduction by correcting hue deviation in the input and output gamuts respectively has accordingly been proposed (for example, see Japanese Patent Laid-Open No. 2002-152536).

However, according to the above-mentioned conventional techniques, a user is required to manually adjust a large number of color conversion parameters when mapping a gamut from a monitor to a color printer. The optimal combination of parameters also depends on, among other things, the monitor and printer models, and thus it takes an inordinate amount of time for the user to determine the optimal control parameters for the gamut map.

Furthermore, because gamut maps are typically configured from maps of a plurality of stages, controlling the mapping process is difficult, and thus a high level of knowledge regarding map conversion is required if the user is to achieve the intended color reproduction. Although mapping parameters are provided in some mapping conversion processes in order to make it easier for the user to control the mapping process, it is nevertheless difficult to understand the effects of the mapping parameters and the influence they have on the overall process.

There is therefore demand for automatic adjustment functionality by which optimal mapping parameters can be obtained, so that effective and uniformly favorable gamut mapping can be realized with regard to unspecified images.

SUMMARY OF THE INVENTION

Having been conceived in light of the aforementioned problems, it is an object of the present invention to provide a color signal conversion method and a color signal conversion apparatus that enable the automatic adjustment of mapping parameters when converting a color signal of an input gamut to a color signal of an output gamut. It is a further object of the present invention to enable favorable color reproduction by automatically correcting hue deviation in the input and output gamuts respectively.

According to one aspect of the present invention, a color signal conversion apparatus for converting a color signal of an input gamut to a color signal of an output gamut is provided. First, a target gamut for gamut mapping carried out on the input gamut is set, after which an evaluation function is determined for evaluating the difference between the target gamut and the results of gamut mapping performed on the input gamut using initialized mapping parameters. Then, the mapping parameters are determined based on the evaluation function so that the difference is minimum. The color signal of the input gamut is then mapped to the output gamut based on the determined mapping parameters and constraining conditions. This makes it possible to achieve favorable gamut mapping based on optimal mapping parameters that have been determined automatically.

According to the present invention, mapping parameters can be automatically adjusted when converting a color signal of the input gamut to a color signal of the output gamut. Furthermore, colors can be favorably reproduced by automatically correcting hue deviation in the input and output gamuts respectively.

Further features of the present invention will become apparent from the following description of exemplary embodiments with reference to the attached drawings.

DESCRIPTION OF THE EMBODIMENTS

Figure 1:
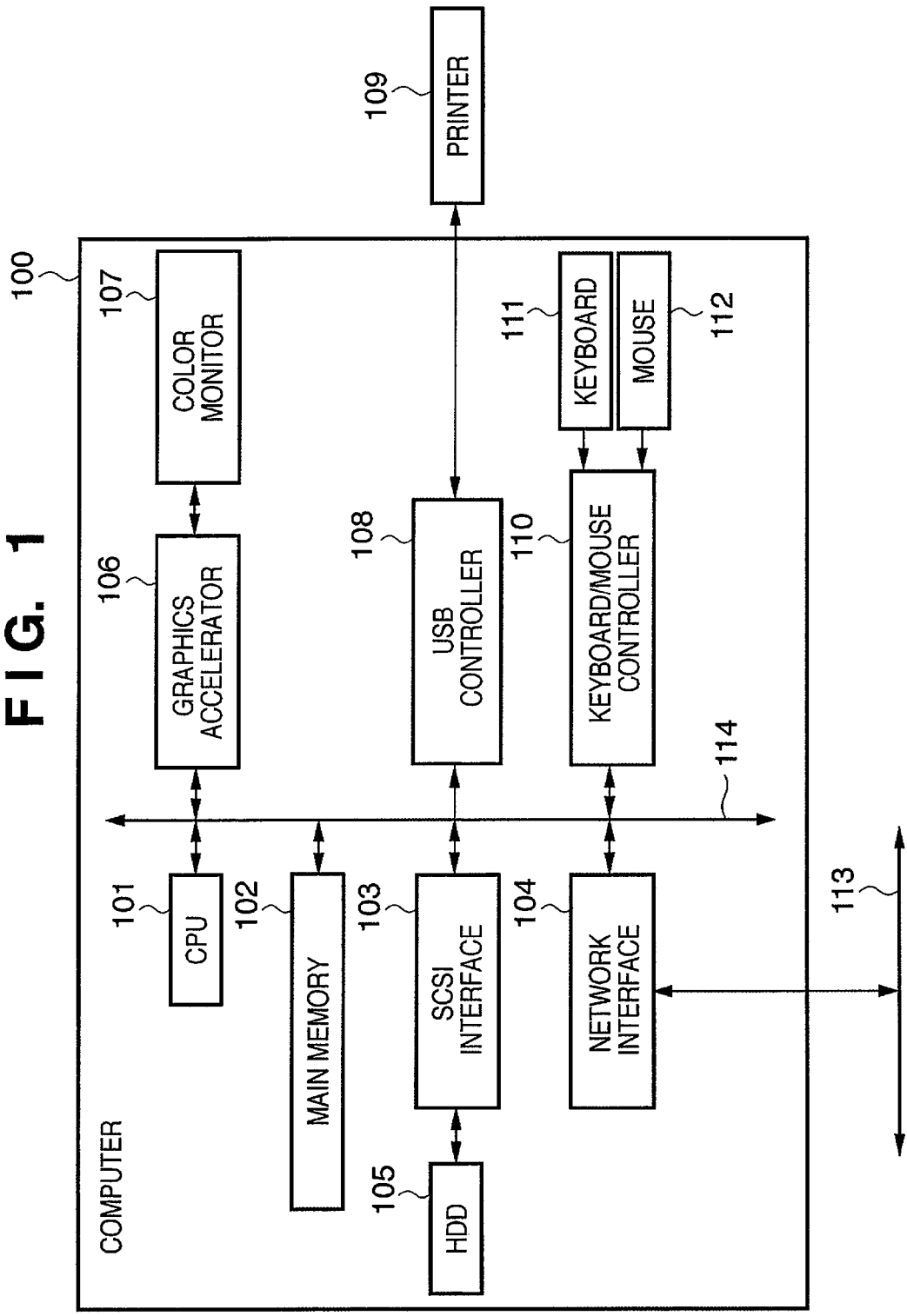
FIG. 1 is a block diagram illustrating an example of a configuration of a system according to an embodiment of the present invention.

Various exemplary embodiments, features, and aspects of the present invention will be described in detail below with reference to the drawings. It should be noted that the configurations described in the following embodiments are merely exemplary, and that the present invention is not intended to be limited to the configurations described therein and illustrated in the drawings.

First Embodiment (System Configuration)

FIG. 1 is a block diagram illustrating an example of a configuration of a system according to an embodiment of the present invention. The system according to the present embodiment is, as illustrated in FIG. 1, configured of a computer 100, which functions as an image processing apparatus in the present embodiment, and a printer 109, which serves as an example of an image output apparatus.

The computer 100 shall be described first. A generic PC (personal computer), WS (workstation), or the like can be employed as the computer 100.

A CPU 101 carries out overall control of the computer 100 using programs, data, and so on stored in a main memory 102, and executes the processes, described later, that the computer 100 carries out. The main memory 102 can provide various areas as appropriate. These areas include an area for temporarily storing programs, data, and so on loaded from an HDD (hard disk drive device) 105, a working area used when the CPU 101 executes various processes, and so on. A SCSI interface 103 functions as an interface for connecting the HDD 105 to a bus 114. A network interface 104 functions as an interface for connecting the computer 100 to a network line 113, examples of which are a LAN, the Internet, and so on. Note that various types can be considered for the network line 113, which is not intended to be limited to either a hard-wired or wireless type. The network interface 104 therefore depends on the network line 113. The HDD 105 stores an OS (operating system), programs, data, and so on for causing the CPU 101 to execute the processes, described later, carried out by the computer 100, driver software for the printer 109, and so on. These items are loaded into the main memory 102 as appropriate under the control of the CPU 101, to be processed by the CPU 101.

A graphics accelerator 106 performs processing for transferring images processed by the CPU 101 to a color monitor 107. The color monitor 107 is configured using a CRT, LCD, or the like, and is capable of displaying the results of processes performed by the CPU 101 as images, characters, or the like. A USB controller 108 functions as an interface for connecting the printer 109 to the bus 114. A keyboard/mouse controller 110 functions as an interface for connecting a keyboard 111, a mouse 112, or the like to the bus 114. Instructions input by an operator of the computer 100 using the keyboard 111 and the mouse 112 are communicated to the CPU 101 via the keyboard/mouse controller 110.

The printer 109 shall be described next. Printers generally have various types of recording systems, but in the present embodiment, the recording systems, functionality, and so on of the printer 109 are not intended to be limited in any particular manner.

(System Operations)

Descriptions shall now be given regarding operations performed by the system according to the present embodiment, which has the configuration illustrated in FIG. 1. The present system is capable of displaying an image in the color monitor 107 as well as printing an image using the printer 109. Regardless of which of these is carried out, it is necessary for the main memory 102 to acquire the image, and various methods for this image acquisition can be considered. Assume, for example, that the operator of the computer 100 uses the keyboard 111 and the mouse 112 to specify a desired image from among images stored in the HDD 105. In such a case, the CPU 101 reads out the specified image from the HDD 105 in response to the operator's specification. The CPU 101 then transfers the read-out image to the main memory 102 via the SCSI interface 103 and the bus 114. Another method assumes that the operator of the computer 100 uses the keyboard 111 and the mouse 112 to specify a desired image from among images stored in a device connected to the network line 113. In this case, the CPU 101 acquires the specified image from the device and stores it in the main memory 102, via the network interface 104 and the bus 114.

The CPU 101 then transfers the acquired image from the main memory 102 to the graphics accelerator 106. The graphics accelerator 106 executes predetermined processing on the transferred image, and then transfers the processed image to the color monitor 107. The image is therefore displayed on the display surface of the color monitor 107.

Next, if the operator of the computer 100 uses the keyboard 111 and the mouse 112 to input an instruction to print the image, the CPU 101 passes the image from the HDD 105 to the driver software of the printer 109, which is already loaded in the main memory 102. The CPU 101 then runs the driver software. Upon being run, the driver software first performs color conversion processing on the image. The color conversion processing shall be described later. The driver software then converts the image on which the color conversion processing has been performed into a CMYK image, and transfers the converted CMYK image to the printer 109 via the USB controller 108. As a result of these operations the printer 109 records the CMYK image onto a recording medium such as paper.

(Color Conversion Processing Performed by Printer Driver)

Figure 2:
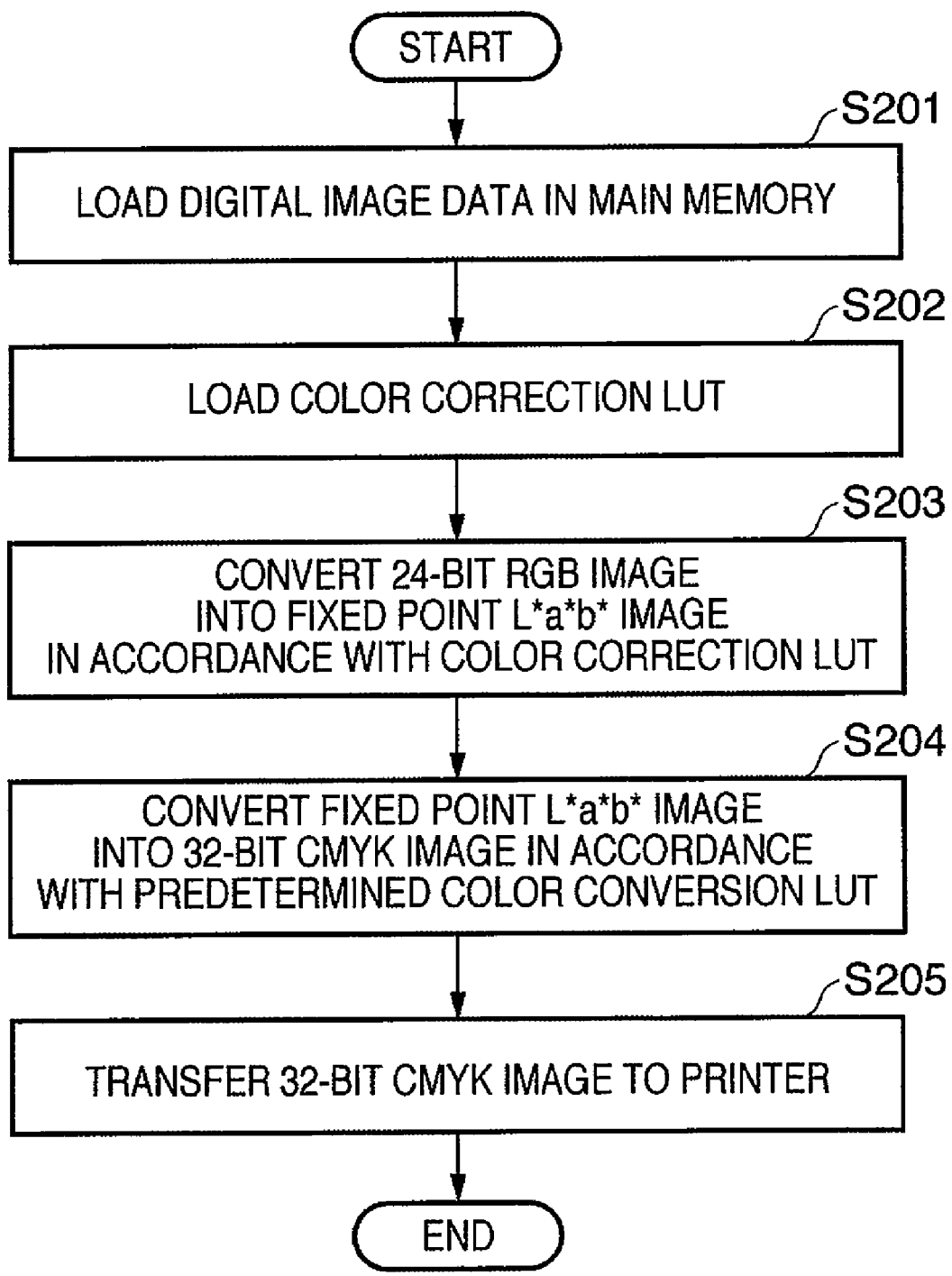
FIG. 2 is a flowchart illustrating color conversion processing performed by a printer driver according to an embodiment of the present invention.

Descriptions shall now be given regarding the color conversion processing carried out due to the abovementioned driver software being run by the CPU 101, with reference to FIG. 2, which is a flowchart that illustrates this processing.

First, image data stored in the main memory 102 is acquired (S201). In the present embodiment, this image data is assumed to be digital data of an image composed of pixels having color information expressed by the RGB color model (in other words, an RGB image). Note that there are, as mentioned above, various methods for acquiring the image, and thus no particular limitations shall be placed thereon.

Next, a color correction LUT (Look-Up Table), which has been created by an automatic color correction LUT creation application (mentioned later) and stored in the HDD 105, is loaded into the main memory 102 (S202).

Figures 3A, 3B:
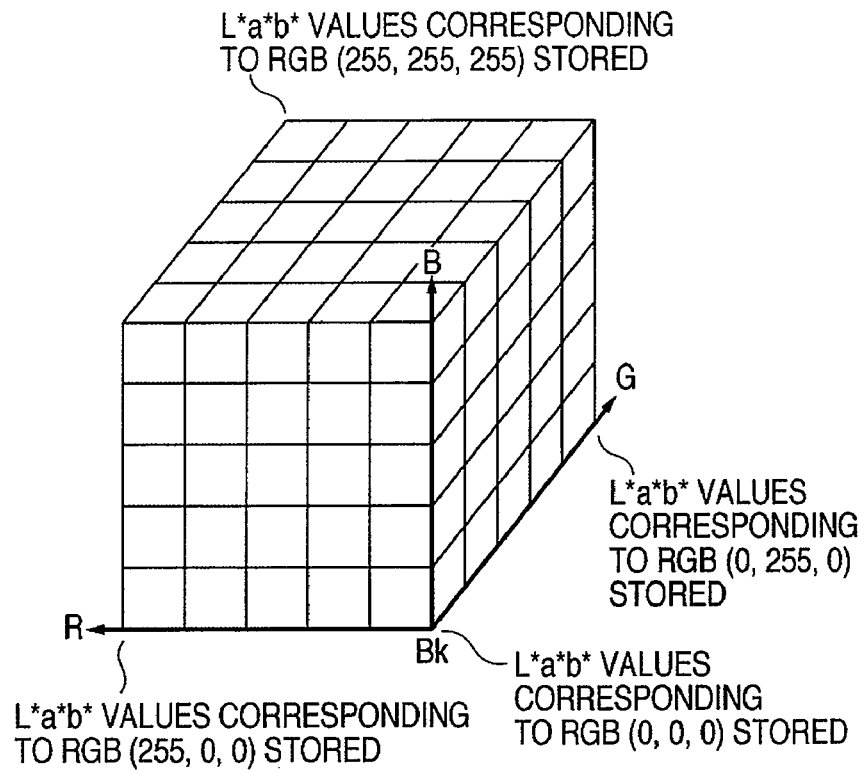
FIG. 3A is a diagram illustrating grid points expressed by LUT grid structure data according to an embodiment of the present invention.
FIG. 3B is a diagram illustrating an example of the configuration of a color correction LUT according to an embodiment of the present invention.

A "color correction LUT" is a table that associates grid point coordinate values of colors in the RGB color space with grid point coordinate values of colors in the L*a*b* color space that correspond to the RGB colors, and is configured, for example, as illustrated in FIG. 3B. FIG. 3B is a diagram illustrating an example of the configuration of the color correction LUT. The color correction LUT is comprised of an LUT grid structure data portion and an LUT grid point data portion. As illustrated in FIG. 3B, the values that R, G, and B can take on are denoted in the LUT grid structure data. R, G, and B in FIG. 3B can all take on discrete values within a range from 0 to 255, in increments, or steps, of 32. In other words, the values that R, G, and B can take on are 0, 32, 64, and so on up to 224, finally stopping at 255.

Meanwhile, FIG. 3A is a diagram illustrating grid points expressed by the LUT grid structure data. Because R, G, and B take on a value of 0, 32, 64 . . . 224, or 255, as described above, the R axis, G axis, and B axis are each divided into 8 equal divisions. The coordinate values of each grid point are expressed as "Grid(R/32, G/32, B/32)".

The coordinate values of grid points in the L*a*b* color space that corresponds to the grid points in the RGB color space shown in FIG. 3A are written in the LUT grid point data. Such LUTs, which indicate a corresponding relationship between colors in the RGB color space and colors in the L*a*b* color space, are publicly-known and thus further descriptions thereof shall be omitted.

It should be noted that the example provided in the present embodiment uses the L*a*b* color space as an intermediate color reproduction color space, which is not dependent on the input color space (that is, the RGB color space) or the output color space (that is, the CMYK color space). Of course, however, the intermediate color reproduction color space is not intended to be limited to L*a*b*; any color space may be used as long as it is a uniform color space that is not dependent upon the input and output color spaces.

Returning to FIG. 2, the color correction LUT acquired in step S202 is used to convert the image acquired in step S201 (here, an image in which R, G, and B are each expressed with 24 bits) into L*a*b* fixed point data (S203). The converted data is stored in the main memory 102. Furthermore, tetrahedral interpolation is used in this conversion.

Next, the L*a*b* fixed point data obtained through the conversion performed in step S203 is converted into 32-bit CMYK image data (an image in which C, M, Y, and K are each expressed with 32 bits) using a predetermined color conversion LUT (S204). This color conversion LUT is created in advance and stored in the HDD 105. Meanwhile, the 32-bit CMYK image data obtained through the conversion performed in step S204 is stored in the main memory 102.

The 32-bit CMYK image data obtained through the conversion performed in step S204 is then output to the printer 109 via the USB controller 108 (step S205).

(Automatic Color Correction LUT Creation Application)

Descriptions shall now be provided regarding an automatic color correction LUT creation application, which creates the color correction LUT that is loaded in the abovementioned step S202. The automatic color correction LUT creation application is stored in the HDD 105, and is loaded into the main memory 102 as appropriate under the control of the CPU 101.

Figure 4:
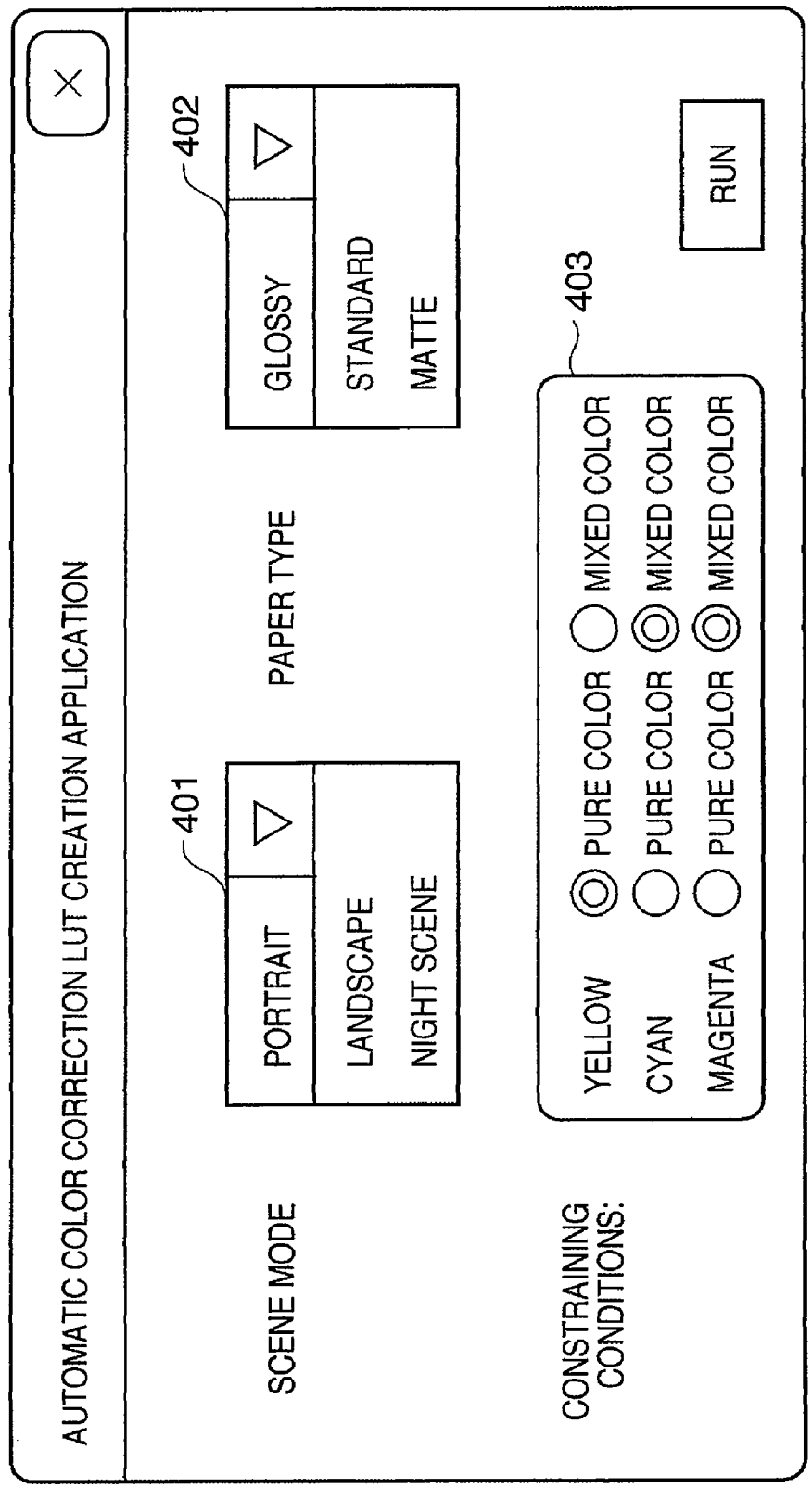
FIG. 4 is a diagram illustrating an example of a GUI displayed when automatically creating a color correction LUT according to an embodiment of the present invention.

When the CPU 101 executes the automatic color correction LUT creation application, the GUI illustrated in FIG. 4 is displayed on the display screen of the color monitor 107. FIG. 4 is a diagram illustrating an example of a GUI displayed for automatically creating a color correction LUT. With the exemplary display shown in FIG. 4, a scene mode menu 401, paper type menu 402, and constraining conditions menu 403 used when outputting the image data can be specified.

Using the scene mode menu 401, the user can select a mode suited to the image data, from among several preset options, such as "portrait", "landscape", "night scene", and so on. A gamut set to correspond to the mode in question is then set as the target gamut based on the selection made using the scene mode menu 401. To put it differently, the target gamut is set in response to the user's instructions. Note that the target gamut is defined by setting the target colors according to a scene, with respect to a plurality of colors in the input gamut, as a color signal in the intermediate color reproduction color space.

Using the paper type menu 402, the user can select a paper type on which to output the image data, from among several preset options, such as "standard", "matte", "glossy", and so on. A gamut set to correspond to the output paper type in question is then set as the gamut in the printer 109 (that is, as the output gamut) based on the selection made using the paper type menu 402. To put it differently, a gamut is set in the printer 109 in response to the user's instructions.

Using the constraining conditions menu 403, constraining conditions for outputting colors of a specific hue in the output gamut as pure colors are set. That is, with the constraining condition setting process of the present embodiment, the user can select whether or not to hold pure colors in the printer 109 with regard to hues such as yellow, magenta, cyan, and so on. For example, the following control is carried out when "pure color" has been selected for yellow. The colors spanning from white to yellow obtained by continuously changing the intensity of yellow in the input gamut are reproduced by colors obtained by continuously changing the intensity of yellow in the output gamut, or in other words, are reproduced using only the pure yellow of the printer 109.

Note here that various methods can be considered for the scene mode settings instead of/in addition to making specifications using the GUI illustrated in FIG. 4. For example, if the image data is saved in the EXIF file format, the scene mode can be set based on information recorded in the EXIF data region.

Note also that the input gamut in the present embodiment is dependent upon the RGB color space of the image data, and thus corresponds to a gamut used by a typical color monitor, such as an sRGB gamut, an Adobe RGB gamut, and so on. In other words, the colors of each grid point in the L*a*b* color space that correspond to each grid point in the RGB color space are taken as the gamut of the color monitor. Accordingly, once the settings carried out using the GUI illustrated in FIG. 4 have ended, the colors of each grid point in the L*a*b* color space that correspond to each grid point in the RGB color space are registered as the gamut of the color monitor, the gamut of the printer 109, and the target gamut.

(Process for Automatically Creating Color Correction LUT)

Figure 5:
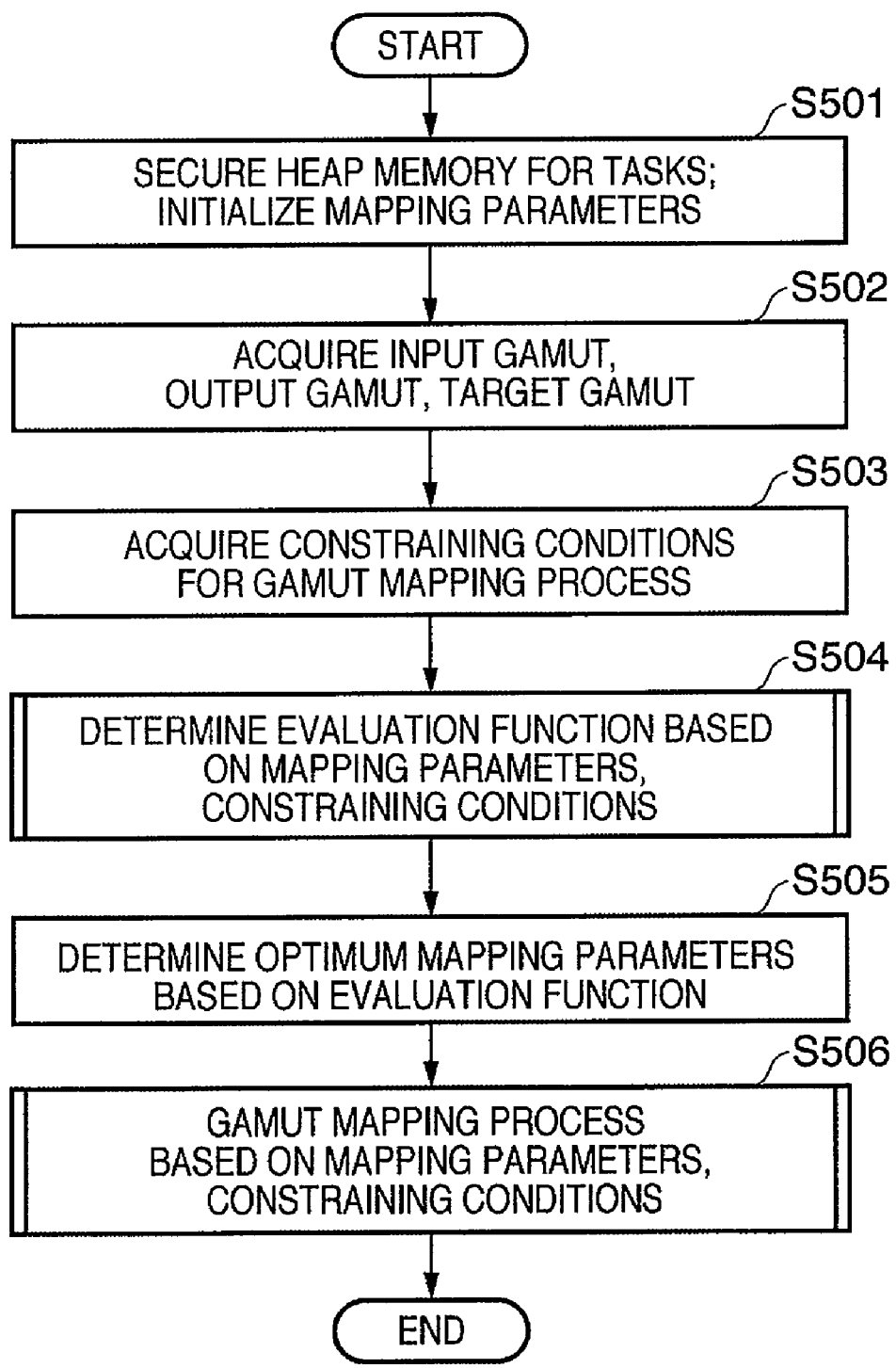
FIG. 5 is a flowchart illustrating a process for automatically creating a color correction LUT according to an embodiment of the present invention.

Descriptions shall now be given regarding the process for automatically creating the color correction LUT, as executed by the aforementioned automatic color correction LUT creation application. These descriptions refer to FIG. 5, which is a flowchart that illustrates this process.

First, a heap memory is secured for tasks in the main memory 102, and various initialization processes, such as the initialization of mapping parameters, are carried out (S501). The color monitor gamut, printer gamut, and target gamut are then acquired based on the details specified using the GUI illustrated in FIG. 4 and are loaded into the main memory 102 (S502). After this, the constraining conditions for the gamut mapping process are acquired through the GUI illustrated in FIG. 4 (S503). In the present embodiment, it is assumed that only yellow has been selected to be held as a pure color.

Next, an evaluation function for determining the mapping parameters is determined (S504). In the present embodiment, a weighting coefficient for calculating evaluation values is determined based on the constraining conditions. This shall be described in detail later.

After that, optimal mapping parameters are determined based on the evaluation function (S505). In the process for determining the mapping parameters in the present embodiment, the mapping parameters are determined in such a manner that the evaluation values based on the evaluation function are minimum values. A well-known optimization method can be used as this determination method. For example, a binary tree search method, the quasi-Newton method, and so on can be used.

Finally, the gamut mapping process is carried out based on the mapping parameters. In other words, the color signal of the color monitor gamut is mapped to the gamut of the printer 109, in the L*a*b* color space (S506). Details regarding the gamut mapping process shall be given later.

The color correction LUT loaded in step S202 is therefore completed through this process.

(Evaluation Function Determination Process)

Figure 6:
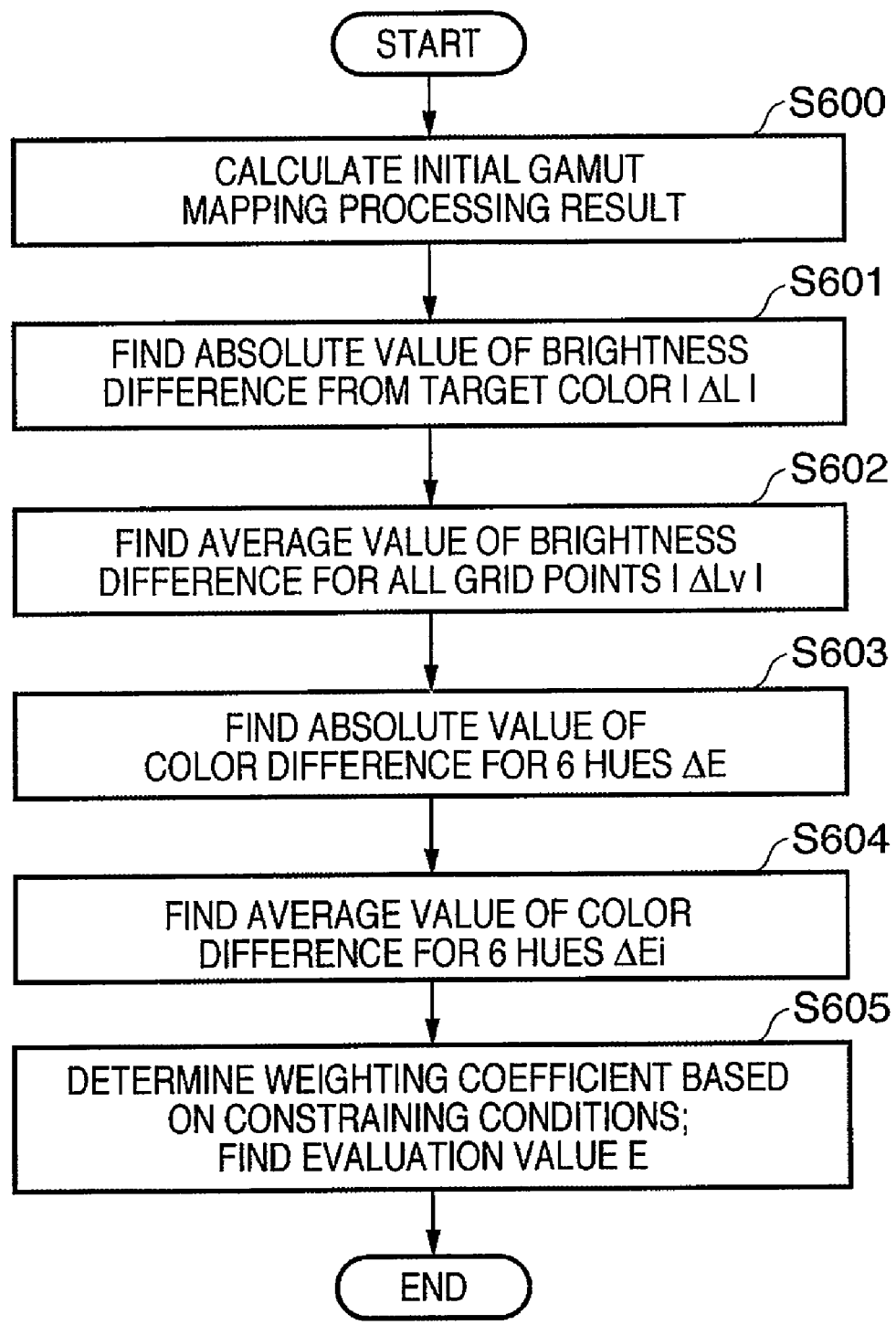
FIG. 6 is a flowchart illustrating a process for determining an evaluation function (S504) according to an embodiment of the present invention.

Next, the process for determining the evaluation function performed in step S504 mentioned above shall be described in detail with reference to the flowchart in FIG. 6. FIG. 6 is a flowchart illustrating the details of the process for determining the evaluation function performed in step S504.

Upon this process commencing, the colors of each grid point in the L*a*b* color space that correspond to each grid point in the RGB color space are obtained through the above-mentioned step S502 as the gamut of the color monitor. The colors of the grid points in the L*a*b* color space obtained through a gamut mapping process similar to that indicated in step S506 are then calculated based on the mapping parameters initialized in step S501, for each grid point (S600). Hereinafter, the result of mapping the grid points in the L*a*b* color space, calculated as mentioned here and obtained through the gamut mapping process based on the initialized mapping parameters, shall be called the "initial gamut mapping process result".

The absolute value of the difference in brightness |ΔL| between corresponding grid points is then found based on the obtained initial gamut mapping process result and the target color of the grid points loaded into the main memory 102 in the aforementioned step S502 (S601). When the difference in brightness has been found for all corresponding grid points, the average value |ΔLv| thereof is found (S602). Here, if the target value is not identical to the number of grid points or the grid point interval of the L*a*b* color space, target colors corresponding to the grid points in the L*a*b* color space are calculated using interpolation.

Figure 7:
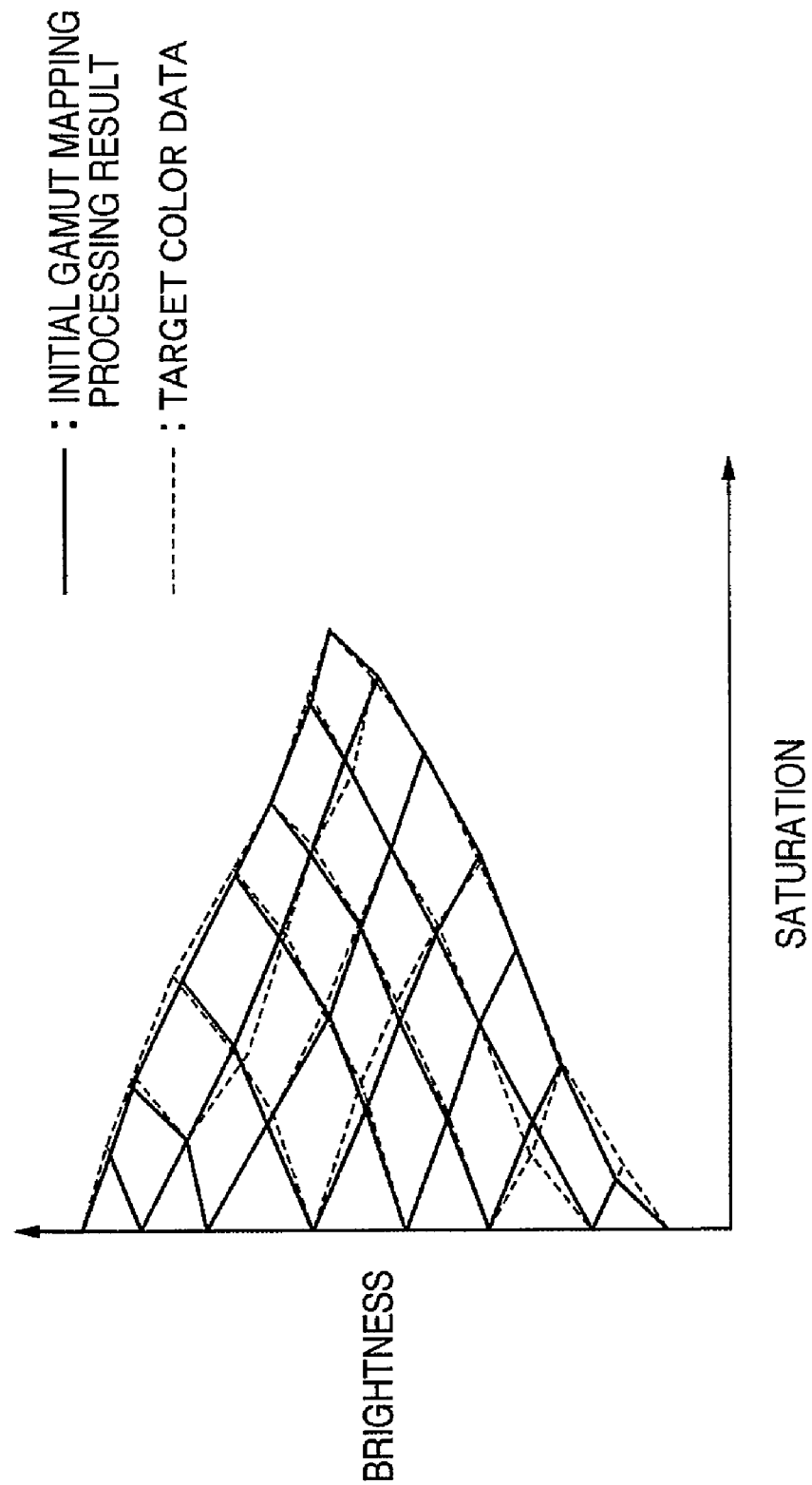
FIG. 7 is a diagram illustrating an example of a target gamut and the result of an initial gamut mapping process, with respect to the R hue.

Next, a single hue is selected from the six RGBCMY hues, and a color difference ΔE between the initial gamut mapping process result for plural grid points located on the screen for the selected hue and the corresponding target gamut is found (S603). The relationship between the target color data and the initial gamut mapping process result with regards to the red (R) hue is illustrated in FIG. 7. In FIG. 7, the solid line represents the initial gamut mapping process result, whereas the dotted line represents the target color data. In other words, the color difference between corresponding grid points in FIG. 7 is found as ΔE.

The average value of the instances of ΔE found for each of the RGBCMY hues, or ΔEi, is found next (S604). Here, the i in ΔEi is a subscript expressing which of RGBCMY the hue is.

Finally, an evaluation value E that verifies the difference between the gamut mapping result using the mapping parameter and the target color, or in other words, an evaluation function, is found based on the following formula (S605).

$$E = |\Delta L| + \Sigma(\beta i \times \Delta Ei), 0 < \beta i < 1$$

Here, βi represents the weighting coefficient set based on the constraining conditions acquired in step S503. For example, if yellow has been selected to be a pure color as part of the constraining conditions, the color difference average ΔEi between the initial gamut mapping process result and the target gamut with respect to the yellow (Y) hue naturally grows larger; therefore, the weighting coefficient βi is made relatively smaller so as to achieve an appropriate evaluation function.

In such a manner, it is possible to reflect various elements in the evaluation value E in the present embodiment. Ultimately, however, it is necessary to create a formula for calculating the evaluation value (that is, the evaluation function) such that the smaller the evaluation value is, the closer the mapping result is to the target value.

(Gamut Mapping Process)

Figure 8:
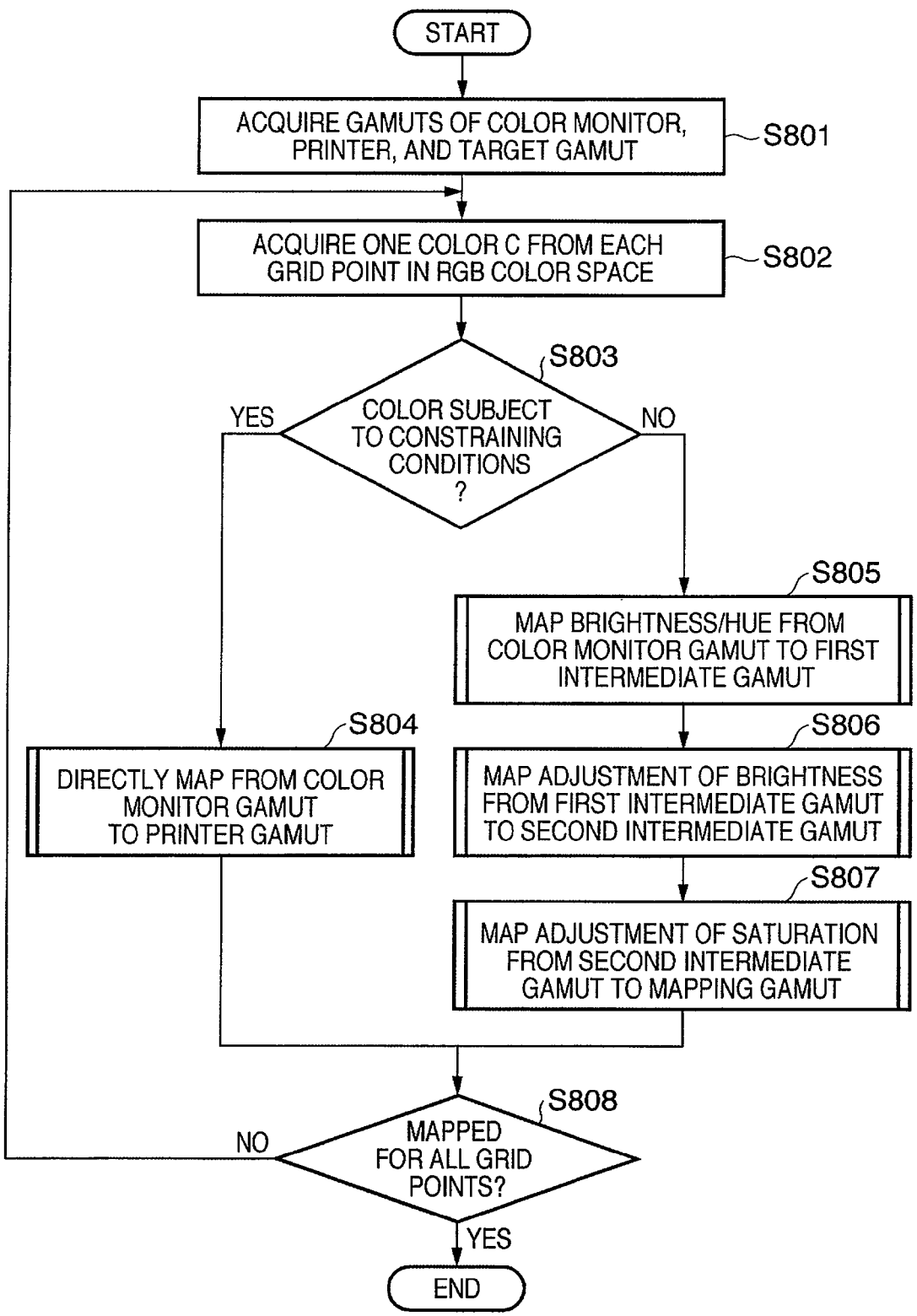
FIG. 8 is a flowchart illustrating a gamut mapping process (S506) according to an embodiment of the present invention.

The gamut mapping process indicated in the aforementioned step S506 shall be described hereinafter, with reference to the flowchart illustrated in FIG. 8.

First, the gamut of the color monitor, the gamut of the printer 109, and the target gamut loaded into the main memory 102 in the aforementioned step S502 are acquired (S801). Here, the colors of each grid point in the L*a*b* color space that correspond to each grid point in the RGB color space are registered as the gamut of the color monitor, the gamut of the printer 109, and the target gamut, as mentioned above.

Next, a single color c is selected from the grid points in the RGB color space (S802). After this, it is determined whether or not the color c is a color subject to the constraining conditions, or in other words, whether or not the color can be expressed solely by a color set so as to be held as a pure color by the constraining conditions (S803). If the color c is subject to the constraining conditions, a process for directly mapping the gamut of the color monitor to the gamut of the printer 109 is carried out (S804). Details regarding this mapping process shall be given later.

Meanwhile, if the color c is not subject to the constraining conditions, the following series of mapping processes is executed.

Figure 9:
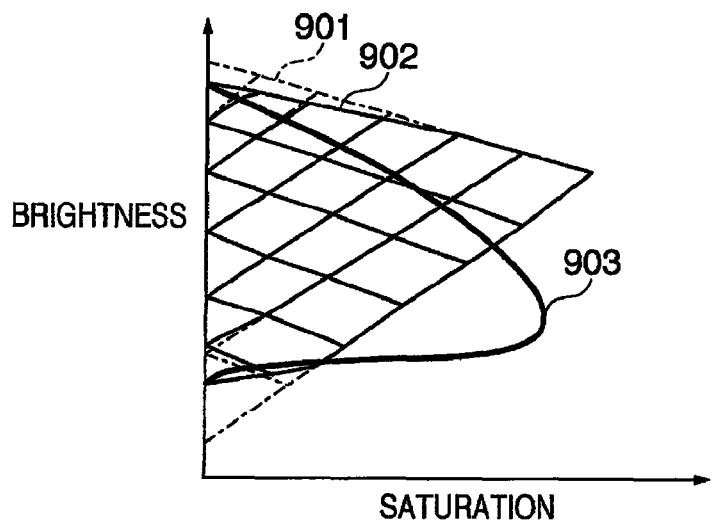
FIG. 9 is a diagram illustrating examples of a color monitor gamut, a first intermediate gamut, and a printer gamut, with respect to the G hue.
Figure 10:
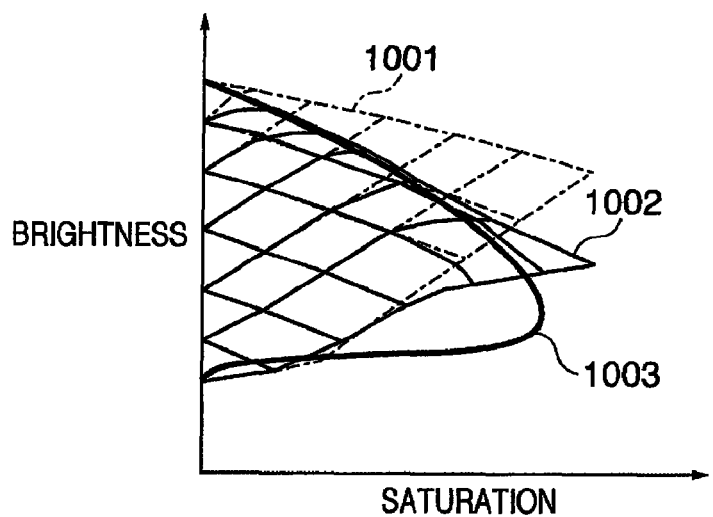
FIG. 10 is a diagram illustrating examples of a first intermediate gamut, a second intermediate gamut, and a printer gamut, with respect to the G hue.

First, the brightness and hue of the color in the gamut of the color monitor is adjusted, and a first intermediate gamut is found (S805). FIG. 9 shows a gamut 901 of the color monitor, a first intermediate gamut 902, and a gamut 903 of the printer 109, with respect to the green (G) hue. In the process indicated in step S805, the color in the gamut of the color monitor is divided into a brightness component and a chromaticity component, and the brightness component is mapped non-linearly. With respect to the chromaticity component, the hue thereof is adjusted in an appropriate manner. Through this process, the gamut 901 of the color monitor is mapped to the first intermediate gamut 902. Details regarding the brightness/hue mapping processes shall be given later. Returning to FIG. 8, the brightness of the color in the first intermediate gamut is then adjusted, and a second intermediate gamut is found (S806). FIG. 10 shows a first intermediate gamut 1001, a second intermediate gamut 1002, and a gamut 1003 of the printer 109, with respect to the green (G) hue. In the process indicated in step S806, the color in the first intermediate gamut 1001 is divided into a brightness component and a chromaticity component, and the brightness component is mapped non-linearly, while the chromaticity component is kept constant. Note that the brightness input/output function for implementing mapping differs depending on the chromaticity. Through this process, the first intermediate gamut 1001 is mapped to the second intermediate gamut 1002. Details regarding the brightness adjustment mapping process shall be given later.

Figure 11:
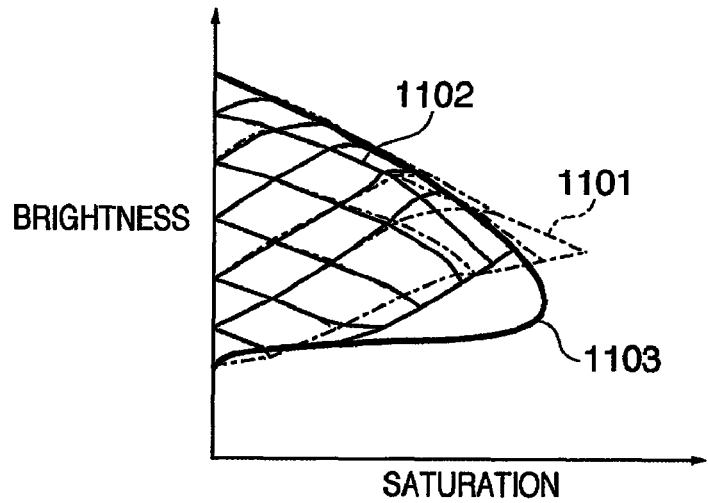
FIG. 11 is a diagram illustrating examples of a second intermediate gamut, a mapping result gamut, and a printer gamut, with respect to the G hue.

Returning to FIG. 8, the saturation of the color in the second intermediate gamut is then adjusted and mapped to the gamut of the printer 109 (S807). FIG. 11 shows a second intermediate gamut 1101, a mapping result gamut 1102, and a gamut 1103 of the printer 109, with respect to the green (G) hue. In the process indicated in step S807, the color in the second intermediate gamut 1101 is divided into a brightness component and a chromaticity component, and the saturation component in the chromaticity component is mapped non-linearly, while the brightness component is kept constant. Through this process, the second intermediate gamut 1101 is mapped to the mapping result gamut 1102. It can be seen in FIG. 11 that the mapping result gamut 1102 is almost completely contained within the gamut 1103 of the printer 109. Details regarding the saturation adjustment mapping process shall be given later.

Finally, in step S808, it is determined whether or not the mapping process described thus far has been carried out for all grid points in the RGB color space (S808). If there are unprocessed grid points, the process returns to step S802, where a grid point that has not yet been selected is selected, and the above mapping process is carried out on the selected grid point.

(Direct Mapping Process)

Figure 12:
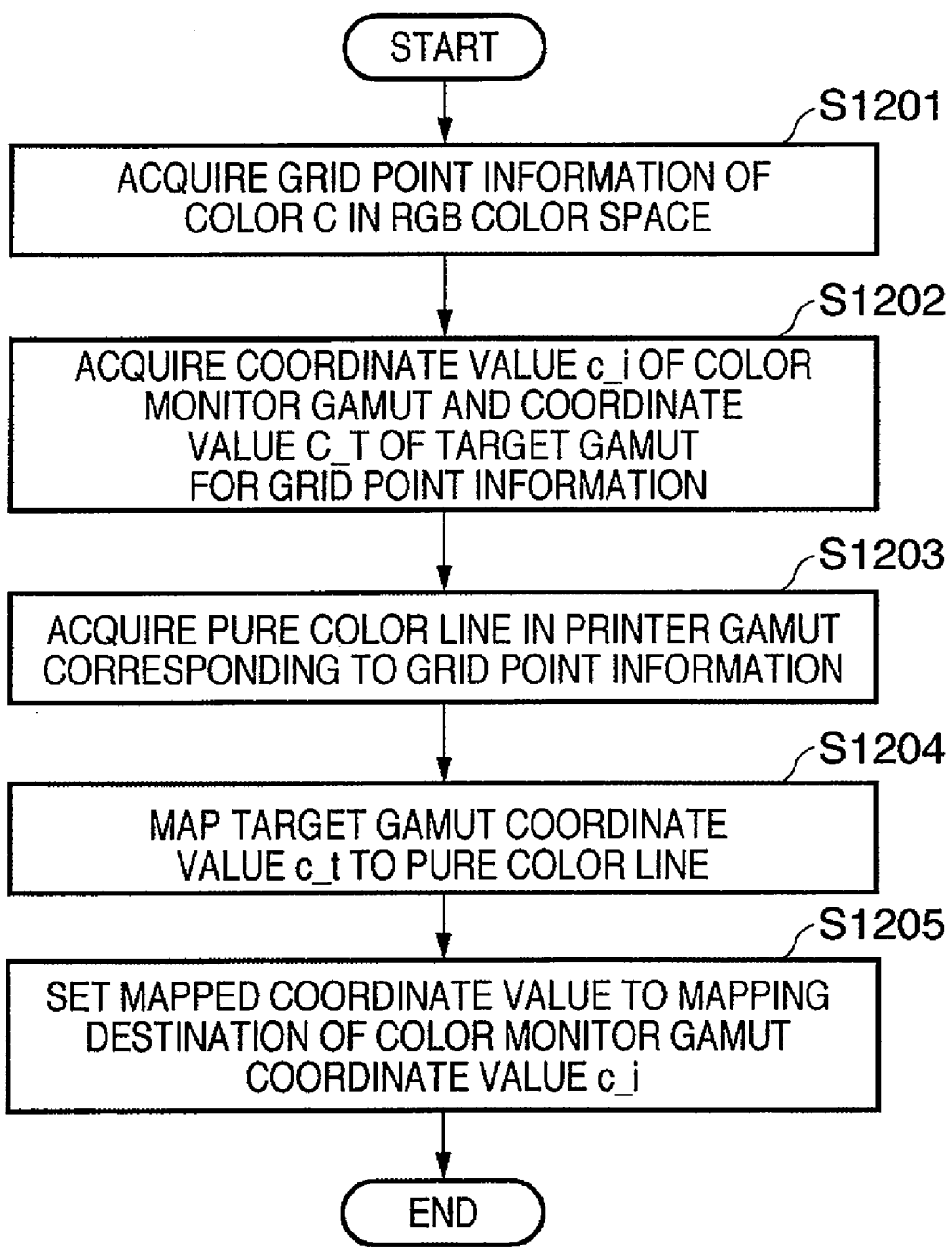
FIG. 12 is a flowchart illustrating a direct mapping process (S804) according to an embodiment of the present invention.

The direct mapping process indicated in the aforementioned step S804 shall be described hereinafter, with reference to the flowchart illustrated in FIG. 12.

First, information regarding the grid points in the RGB color space with respect to the color c selected in step S802 is acquired (S1201). Coordinate values $c\_i$, which are coordinate values in the gamut of the color monitor, and coordinate values $c\_t$, which are coordinate values in the target gamut, are then acquired; these coordinate values correspond to the grid point information acquired in step S1201 (S1202). Here, if the information of the grid points in the RGB color space is not equal to the number of grid points or grid point intervals in the gamut of the color monitor or the target gamut, coordinate values corresponding to the grid point information are calculated through interpolation.

Next, a pure color line $l\_p$ is acquired for the hue, which has specified to be held as a pure color due to the constraining conditions, in the gamut of the printer 109, the hue corresponding to the grid point information acquired in step S1201 (S1203). "Pure color line" refers to the trajectory of a color in which the intensity of the pure color in the gamut of the printer 109 is continuously changed, or in other words, a line from white to the pure color's maximum intensity. For example, if the gamut of the printer has the color distribution indicated by the color correction LUT shown in FIG. 3A, the pure color line can be calculated through interpolation based on the coordinate values of discrete grid points.

Next, coordinate values $c\_p$, resulting from mapping the coordinate values $c\_t$ of the target gamut on the pure color line $l\_p$ acquired in step S1203, are acquired (S1204). The mapping process used here may employ a publicly-known mapping method. For example, mapping that brings the color difference to a minimum may be used.

Finally, the coordinate values $c\_p$ on the pure color line $l\_p$ are set as the mapping destination of the coordinate values $c\_i$ corresponding to the information of the grid points in the gamut of the color monitor (S1205).

In the present embodiment, mapping is carried out onto the pure color line for the color subject to the constraining conditions set using the GUI shown in FIG. 4. Accordingly, hue deviation can be corrected automatically in the input and output gamuts with respect to colors for which pure colors are desirable (for example, yellow and the like), thereby avoiding muddying caused by contamination from other colors and making perceptually favorable color reproduction possible.

(Brightness/Hue Mapping Process)

Figure 13:
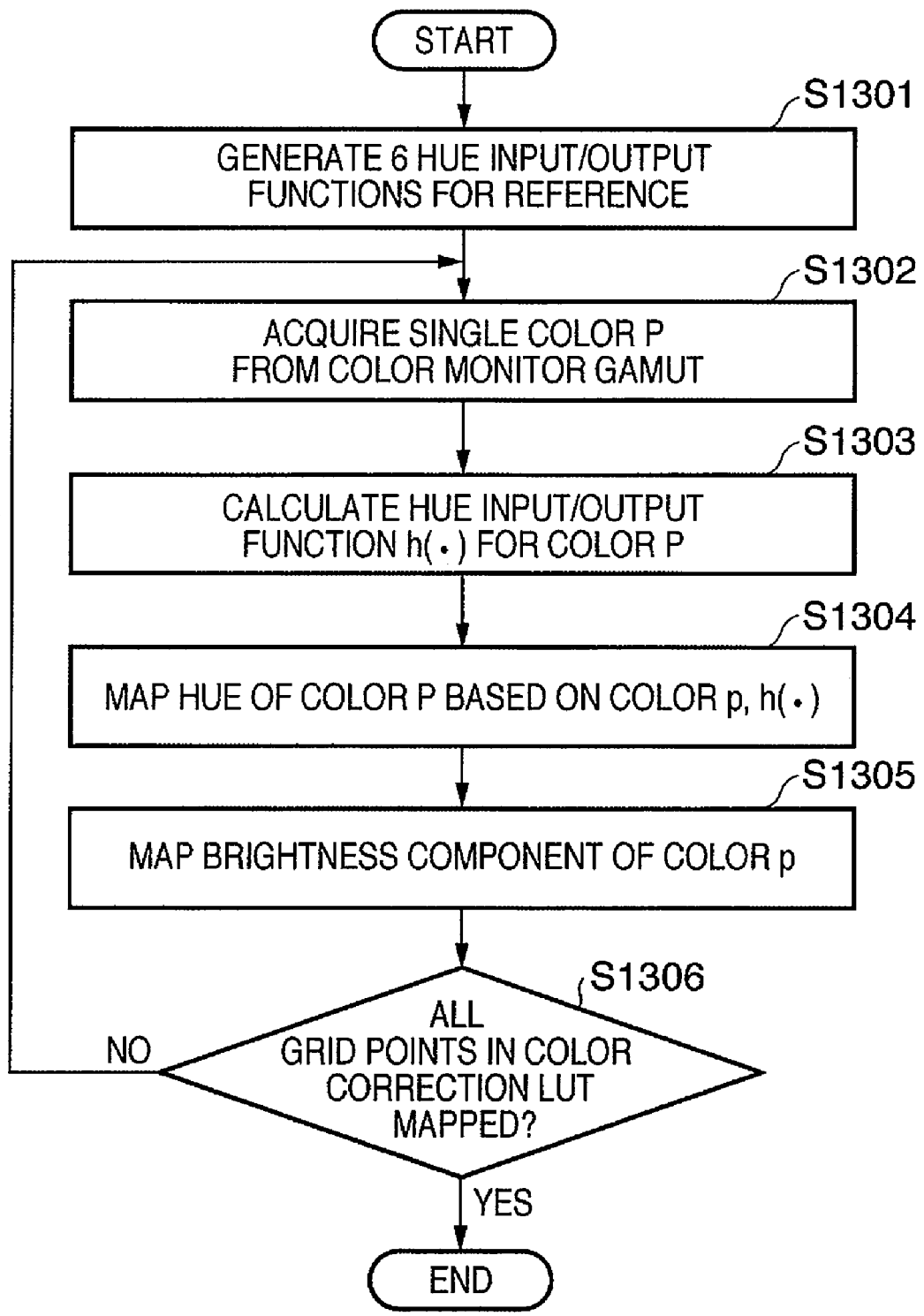
FIG. 13 is a flowchart illustrating a brightness/hue mapping process (S805) according to an embodiment of the present invention.

The brightness/hue mapping process indicated in the aforementioned step S805 shall be described hereinafter, with reference to the flowchart illustrated in FIG. 13.

Six hue input/output functions used as references are first generated (S1301). For example, hue input/output functions $h0(\cdot)$, $h20(\cdot)$, $h40(\cdot)$, $h60(\cdot)$, $h80(\cdot)$, and $h100(\cdot)$ are respectively generated for six brightnesses 0, 20, 40, 60, 80, and 100. Here, the hue input/output functions $h(\cdot)$ are calculated based on mapping parameters $h\_p$ that respectively control each of the six hues (R, G, B, C, M, Y) in each brightness. The mapping parameters $h\_p$ indicate the amount by which the hue angles of each hue are corrected. These parameters are hue control values that take on values of integers from −20 to 20 using radian notation assuming that the counter-clockwise direction is positive, and are set in step S505. In other words, the mapping parameters $h\_p$ are optimized so that the evaluation values based on the evaluation function set in step S504 are minimum.

Figure 14:
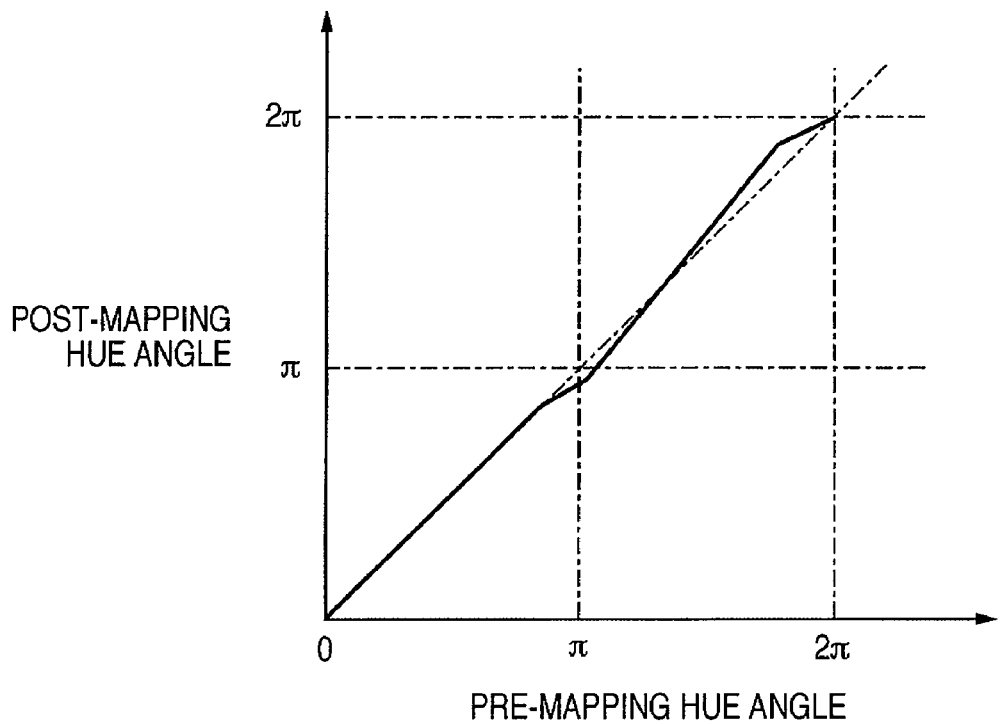
FIG. 14 is a diagram illustrating an example of a hue input/output function h80(•) according to an embodiment of the present invention.

The process for generating the hue input/output function in step S1301 shall be described in detail hereinafter. For example, the function h0(•) is calculated taking the hue control values for each of the six hues at a brightness of 0 as a linear spline, or in other words, as a function connected by a straight line. The other functions are calculated in the same manner, taking the hue control values for each of the six hues in the corresponding brightness as a linear spline, or in other words, as a function connected by a straight line. The hue input/output functions are thus created for each brightness. For example, if for a brightness value of 80, the hue angles of the R and Y hues are moved slightly to the plus side, and the hue angle of the B hue is moved slightly to the minus side, a hue input/output function h80(•) as indicated by the solid line in FIG. 14 is obtained. Note that in FIG. 14, the hue angle is expressed using radian notation assuming that the counterclockwise direction is positive, with the forward direction of the b* axis taken as the hue angle 0 rad in an a*b* chromaticity coordinate system.

Returning to FIG. 13, the subsequent processing is carried out for each color corresponding to the respective grid points in the RGB color space. Therefore, first, a single grid point is selected from the gamut of the color monitor, and a color p corresponding to the selected grid point is acquired (S1302). After this, the hue input/output function h0(•) is generated for the color p using the abovementioned h0(•), h20(•), h40(•), h60(•), h80(•), and h100(•) (S1303).

The method for calculating the hue input/output function h0(•) in step S1303 shall be described in detail hereinafter. Assuming the brightness of the color p is x, a hue input/output function hup(•) corresponding to a brightness value "up" that is directly above the brightness x and a hue input/output function hlw(•) corresponding to a brightness value "lw" that is directly below the brightness x are first identified from among the brightnesses 0, 20, 40, 60, 80, and 100. The hue input/output function h(•) for the color p is then calculated through the following formula, using the hue input/output functions hup(•) and hlw(•).

$$h(\bullet)=(hlw(\bullet)\times(up-x)+hup(\bullet)\times(x-lw))/20$$

For example, if x=70, the brightness directly above is 80, and the brightness directly below is 60; therefore, the hue input/output function h(•) for the color p is calculated as follows, using the hue input/output functions h80(•) and h60(•).

$$h(\bullet)=(h60(\bullet)+h80(\bullet))/2$$

After this, the hue Hue_m of the color p is mapped to Hue_m_mapped through the following formula, using the hue input/output function h(•) found above (S1304).

$$Hue\_m\_mapped=h(Hue\_m)$$

The brightness component of the color p is then mapped (S1305). Here, the pre-mapping brightness Lin is mapped to Lmapped using a single mapping function not dependent on the chromaticity.

$$Lmapped=l(Lin)$$

The mapping function l(•) in the above formula is defined as below, based on the mapping parameter l_all that controls the overall brightness.

l_all greater than or equal to 50:

$$l(\bullet)=(150(\bullet)\times(100-l\_all)+1100(\bullet)\times(l\_all-50))/50$$

l_all less than 50:

$$l(\bullet)=(10(\bullet)\times(50-l\_all)+150(\bullet)\times(l\_all))/50$$

Figure 15A:
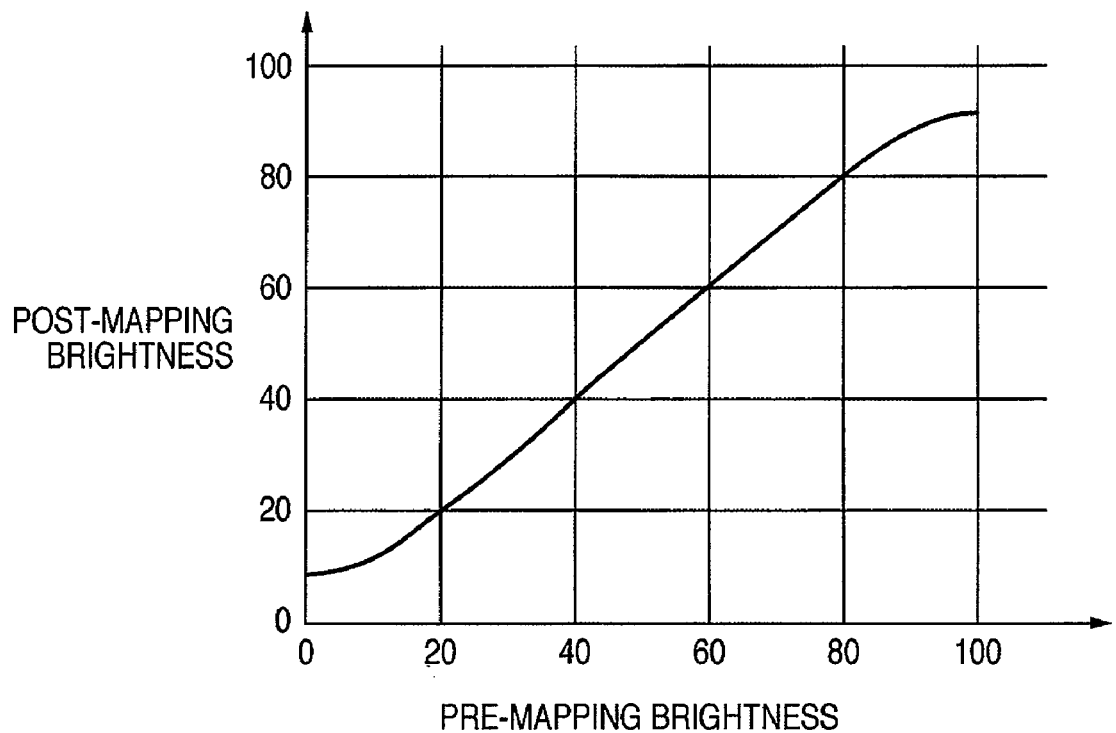
FIG. 15A is a diagram illustrating an example of a map function 10(•) according to an embodiment of the present invention.
Figure 15B:
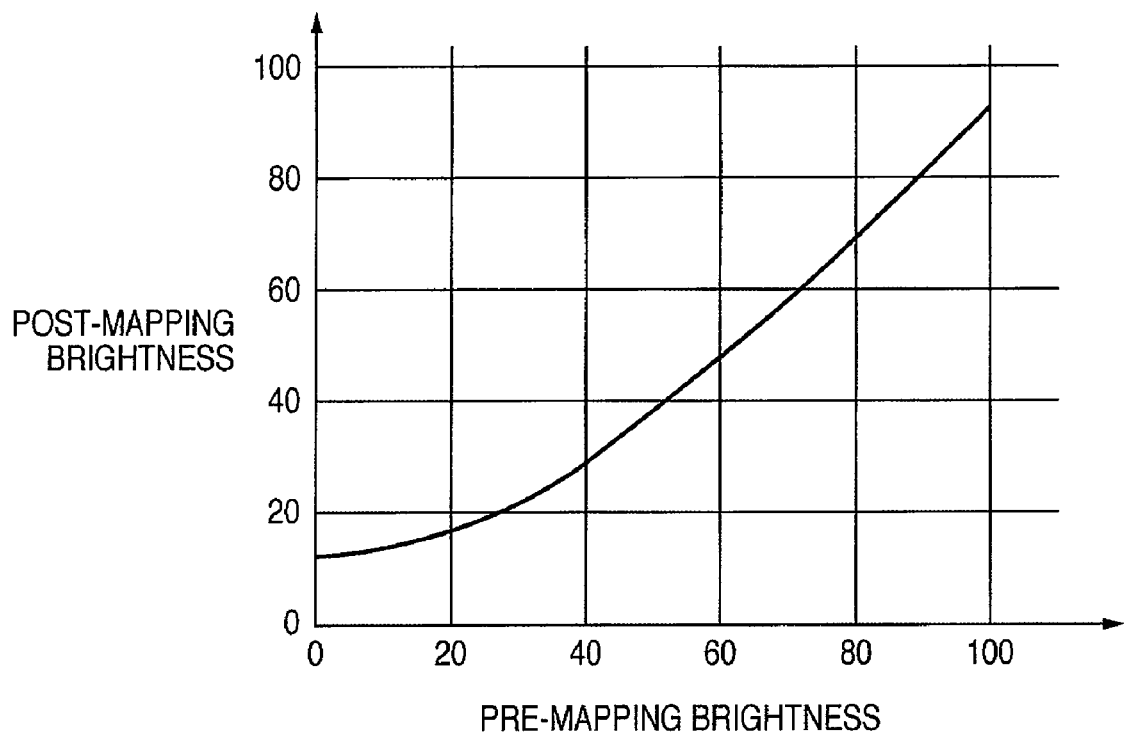
FIG. 15B is a diagram illustrating an example of a map function 150(•) according to an embodiment of the present invention.
Figure 15C:
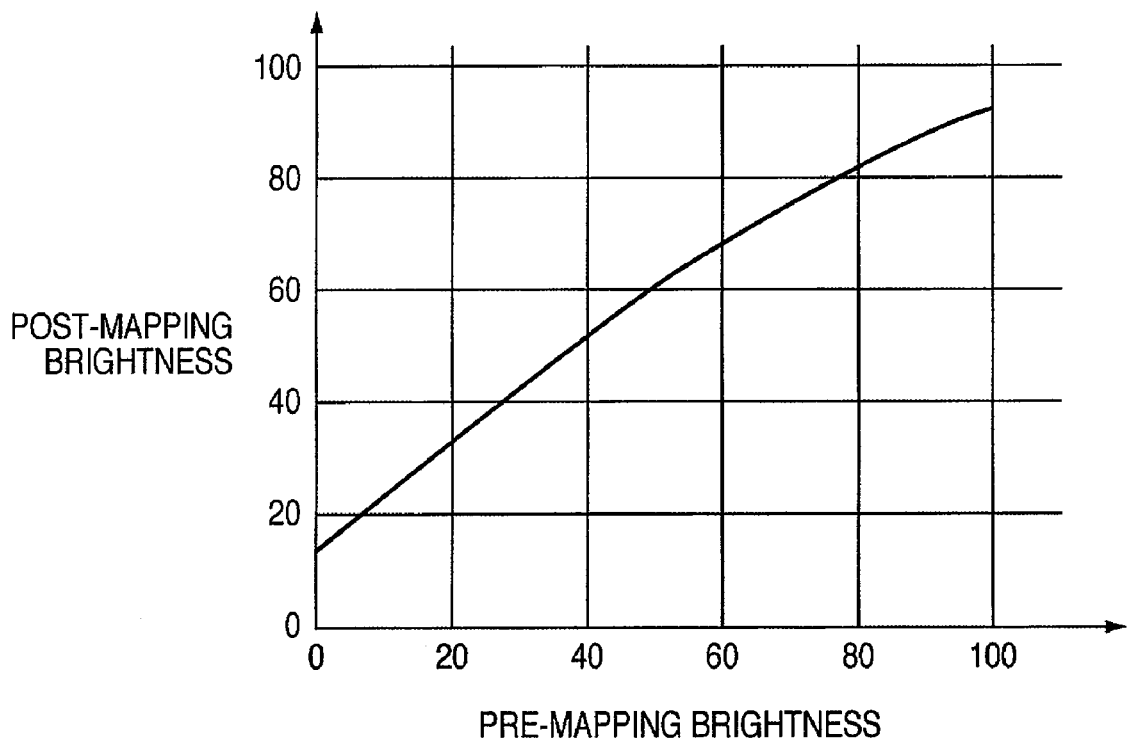
FIG. 15C is a diagram illustrating an example of a map function 1100(•) according to an embodiment of the present invention.

Here, 10(•), 150(•), and 1100(•) are predetermined functions, where 10(•) is a mapping function for when the brightness x of the color p is 0, 150(•) is a mapping function for when the brightness x is 50, and 1100(•) is a mapping function for when the brightness x is 100. The forms of the mapping functions 10(•), 150(•), and 1100(•) are illustrated in FIGS. 15A, 15B, and 15C, respectively. As can be seen in these diagrams, the brightness when the mapping parameter l_all is 0 is generally low, whereas the brightness is generally high when l_all is 100; the brightness is medium when l_all is 50. It should be noted that the mapping parameter l_all that controls the overall brightness is optimized within the range from 0 to 100 so that the evaluation values based on the abovementioned evaluation function are minimum.

Once again returning to FIG. 13, it is determined whether or not the series of mapping processes described above have been executed on all grid points (S1306). If there are unprocessed grid points, the process returns to step S1302, where a grid point that has not yet been selected is selected, and the above mapping process is carried out on the selected grid point.

(Brightness Adjustment Mapping Process)

Figure 16:
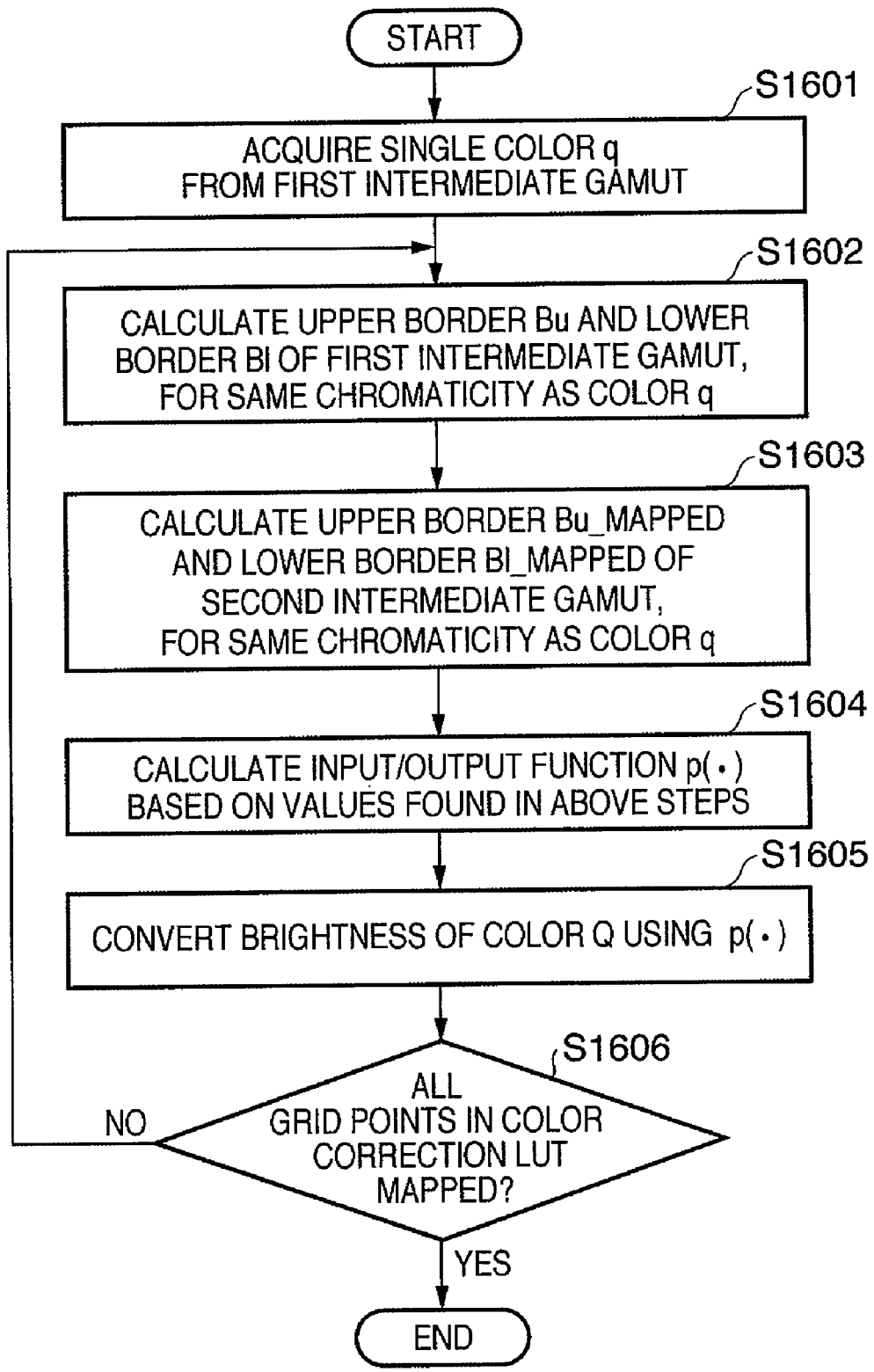
FIG. 16 is a flowchart illustrating a brightness adjustment mapping process (S806) according to an embodiment of the present invention.

The brightness adjustment mapping process indicated in the aforementioned step S806 shall be described hereinafter, with reference to the flowchart showing this process, illustrated in FIG. 16.

Figure 17:
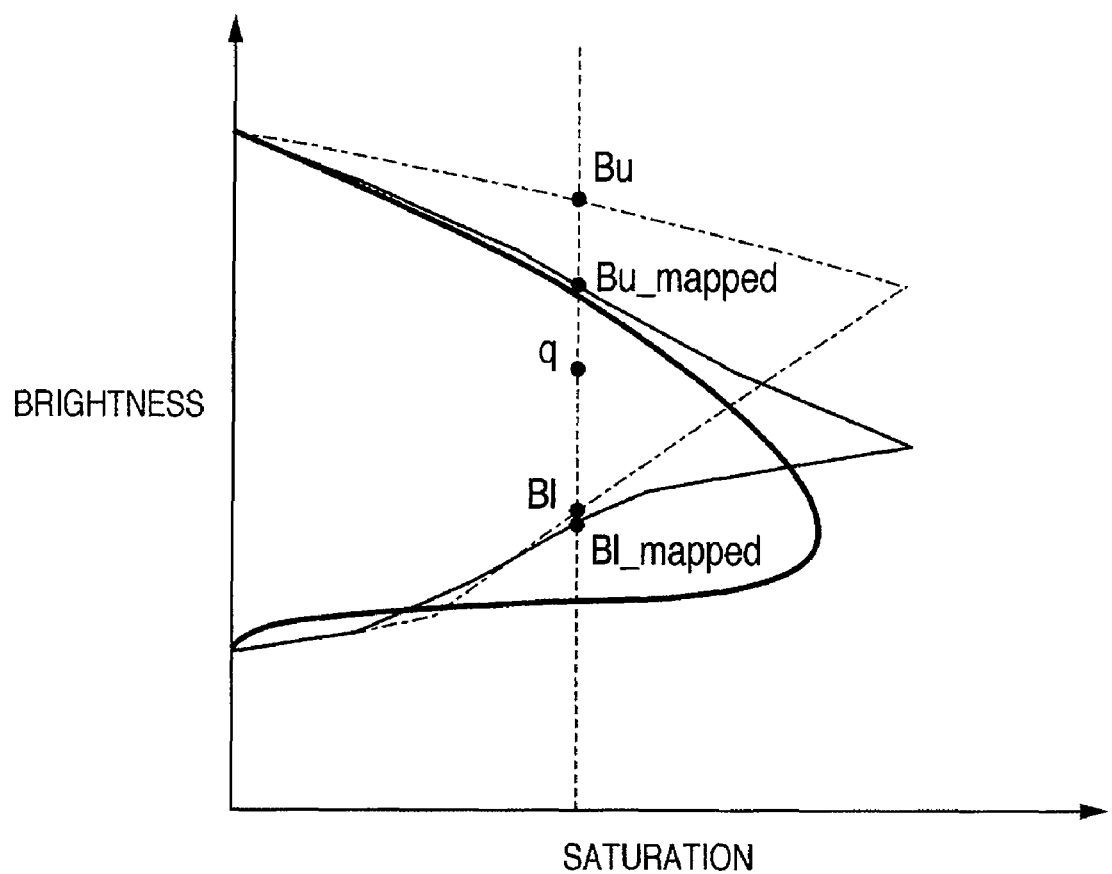
FIG. 17 is a diagram illustrating a brightness adjustment mapping process according to an embodiment of the present invention.

First, a single color q is selected in the first intermediate gamut (S1601). Then, the upper border Bu and lower border Bl of the first intermediate gamut in the same chromaticity as the color q are found (S1602). The upper border Bu_mapped and lower border Bl_mapped of the second intermediate gamut in the same chromaticity as the color q are found next (S1603). FIG. 17 illustrates examples of the color q, the upper border Bu, the lower border B1, the upper border Bu mapped, and the lower border Bl_mapped. In FIG. 17, the dot-dash line indicates the first intermediate gamut, the solid line indicates the second intermediate gamut, and the bold solid line indicates the gamut of the printer 109. The shapes of the gamuts in FIG. 17 are identical to the examples shown in FIG. 10.

Returning to FIG. 16, an input/output function p(•), which maps the brightness adjustment, is found (S1604). The input/output function p(•) is calculated as a C2-continuous cubic spline function that fulfils the following conditions:

the range of p(•) is [LBl, LBu]
p(•) increases monotonically in the range
p(LBl)=LBlm
p(LBu)=LBum
p(•) is at least C1-continuous
p'(LBl)=l_low, l_low>0, where l_low is a mapping parameter that controls the compression/expansion rate of the brightness correction in the vicinity of the minimum brightness areas within the same chromaticity
p'(LBu)=l_high, l_high>0, where l_high is a mapping parameter that controls the compression/expansion rate of the brightness correction in the vicinity of the maximum brightness areas within the same chromaticity Note that LBl is the brightness of Bl, LBlm is the brightness of Bl_mapped, LBu is the brightness of Bu, and LBum is the brightness of Bu_mapped.

Furthermore, the mapping parameters l_low and l_high, which control the brightness, are optimized within the range from 0.5 to 2.0 so that the so that the evaluation values based on the above-mentioned evaluation function are minimum.

Figure 18A:
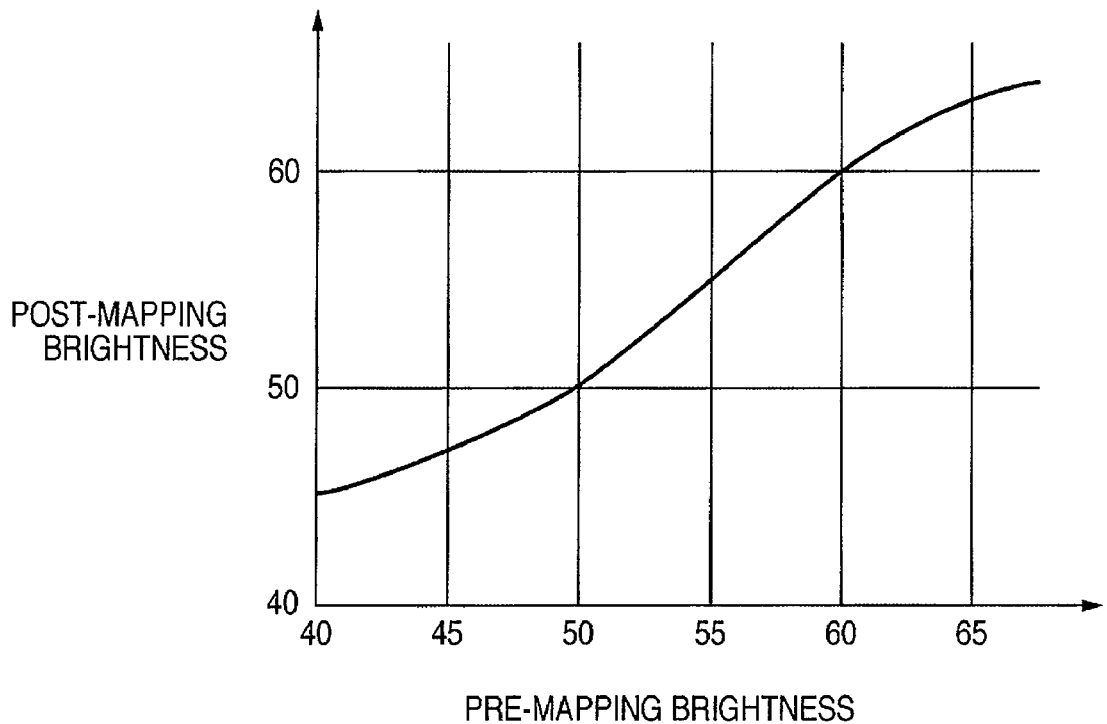
FIG. 18A is a diagram illustrating an example of an input/output function p(•) used for brightness adjustment mapping according to an embodiment of the present invention.
Figure 18B:
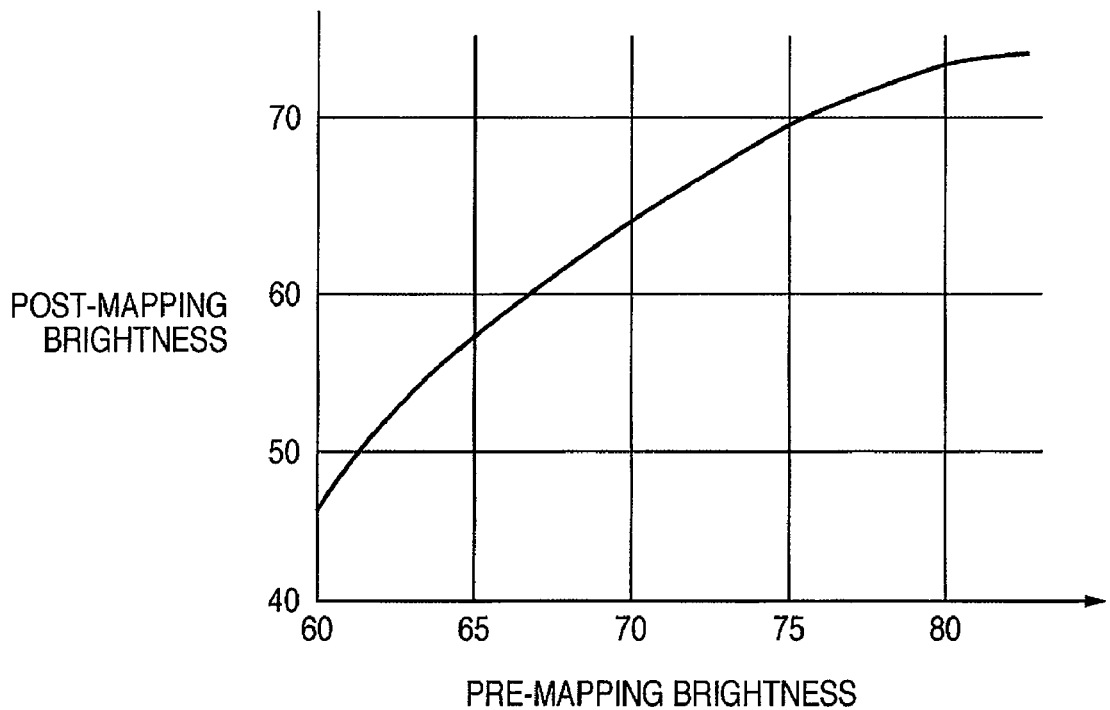
FIG. 18B is a diagram illustrating another example of an input/output function p(•) used for brightness adjustment mapping according to an embodiment of the present invention.

FIGS. 18A and 18B illustrate an example of the input/output function p(•). In FIG. 18A, the brightness in the central portion of the range is maintained. However, for example, LBl=40 while LBlm=45, and LBu68 while LBum=64, which means, in other words, that the low brightness areas and the high brightness areas are significantly compressed.

The change in the brightness in FIG. 18B is great, and although a characteristic in which the brightness is held can be seen in the central portion of the range, it is not held completely. For example, LBl=60, whereas LBlm=46, and LBu=84, whereas LBum=75, which means, in other words, that the low brightness areas are significantly expanded while the high brightness areas are significantly compressed.

Returning to FIG. 16, the pre-mapping brightness Lm of the color q is converted (mapped) using the input/output function p(•) found in step S1604, and a post-mapping brightness Lm_mapped is found (S1605). The formula for this mapping is as follows.

$$Lm\_mapped = p(Lm)$$

After this, it is determined whether or not the abovementioned processing has been carried out on all grid points in the first intermediate gamut that correspond to the grid points in the RGB color space (S1606). If there are unprocessed grid points, the process returns to step S1601, where the color of a grid point that has not yet been selected is selected, and the subsequent processing is repeated.

(Saturation Adjustment Mapping Process)

Figure 19:
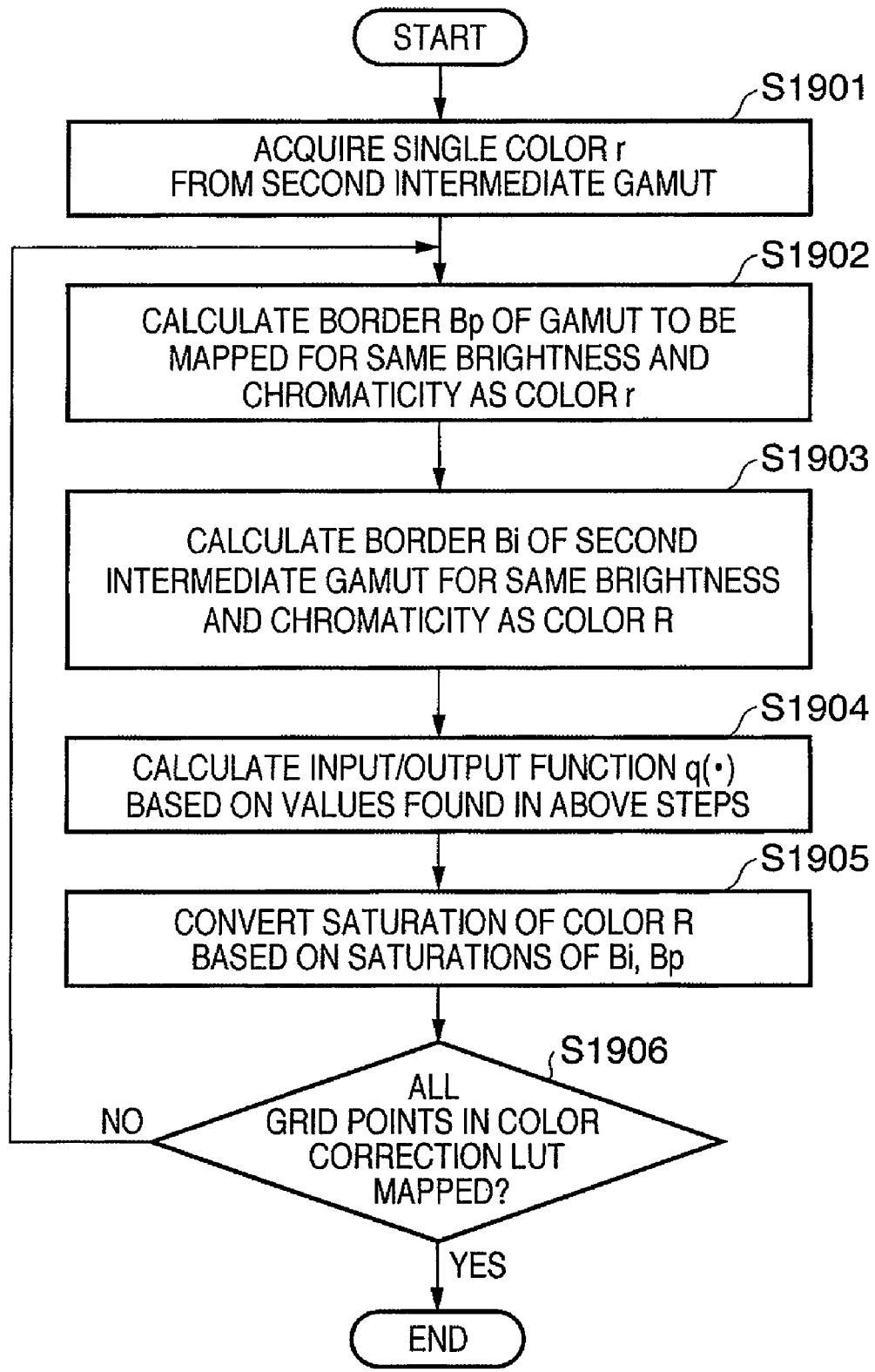
FIG. 19 is a flowchart illustrating a saturation adjustment mapping process (S807) according to an embodiment of the present invention.

Hereinafter, the saturation adjustment mapping process indicated in the aforementioned step S807 shall be described hereinafter, with reference to the flowchart illustrated in FIG. 19.

Figure 20:
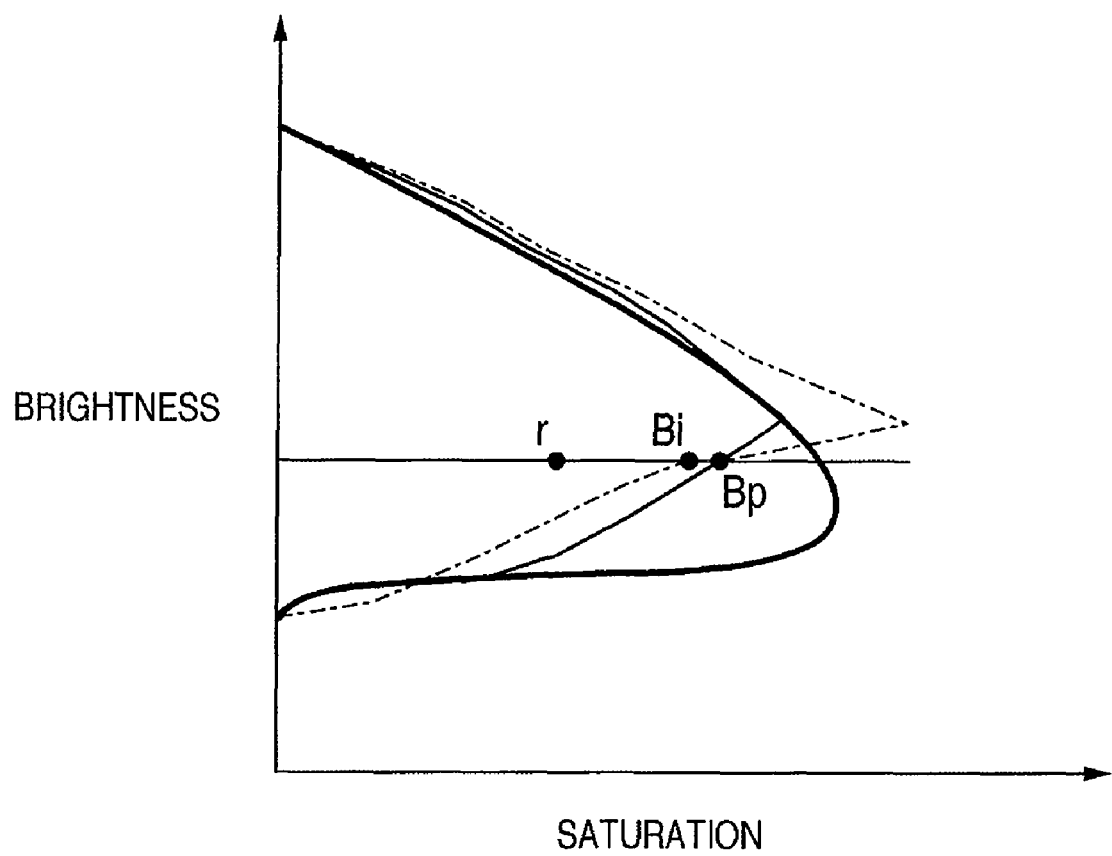
FIG. 20 is a diagram illustrating a saturation adjustment mapping process according to an embodiment of the present invention.

First, a single color r is selected in the second intermediate gamut (S1901). Then, a border Bp of a gamut resulting from the gamut mapping process in the same chromaticity and hue as the color r is found (S1902). After this, a border Bi of a the second intermediate gamut in the same chromaticity and hue as the color r is found (S 1903). FIG. 20 illustrates examples of the color r, the border Bp, and the border Bi. In FIG. 20, the dot-dash line indicates the second intermediate gamut, the solid line indicates the border in the gamut resulting from the gamut mapping process, and the bold solid line indicates the gamut of the printer 109. The shapes of the gamuts in FIG. 20 are identical to those shown in FIG. 11.

Returning to FIG. 19, an input/output function q(•), which maps the saturation adjustment, is found (S1904). The input/output function q(•) is calculated as a C2-continuous cubic spline function that fulfils the following conditions:

the range of q(•) is [0, ci]

q(0)=0 q(ci) cp q'(0)=c_low, where c_low is a mapping parameter that controls the compression/expansion rate of the saturation correction in the vicinity of the low to medium saturation areas q'(ci)=c_high, where c_high is a mapping parameter that controls the compression/expansion rate of the saturation correction in the vicinity of the maximum saturation areas q'(x)≠0, 0<x<ci Note that cp is the saturation of Bp, and ci is the saturation of Bi.

Furthermore, the mapping parameters c_low and c_high, which control the saturation, are optimized within the range from 0.5 to 2.0 so that the evaluation values based on the abovementioned evaluation function are minimal.

Figure 21A:
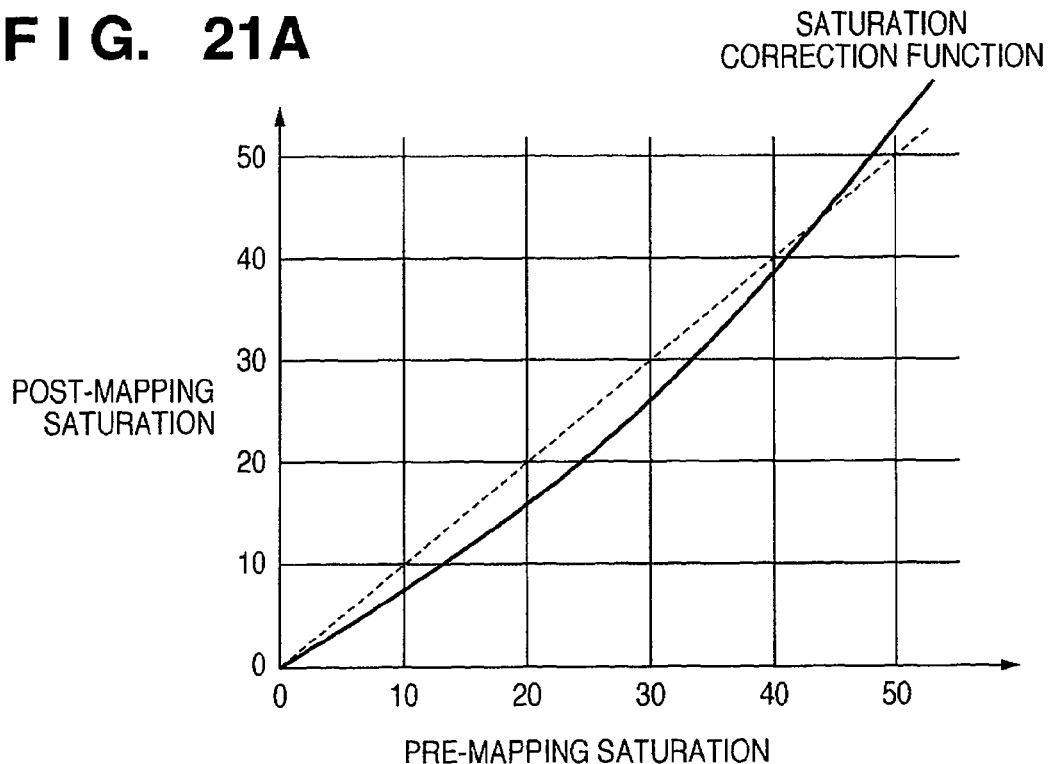
FIG. 21A is a diagram illustrating an example of an input/output function q(•) used for saturation adjustment mapping according to an embodiment of the present invention.
Figure 21B:
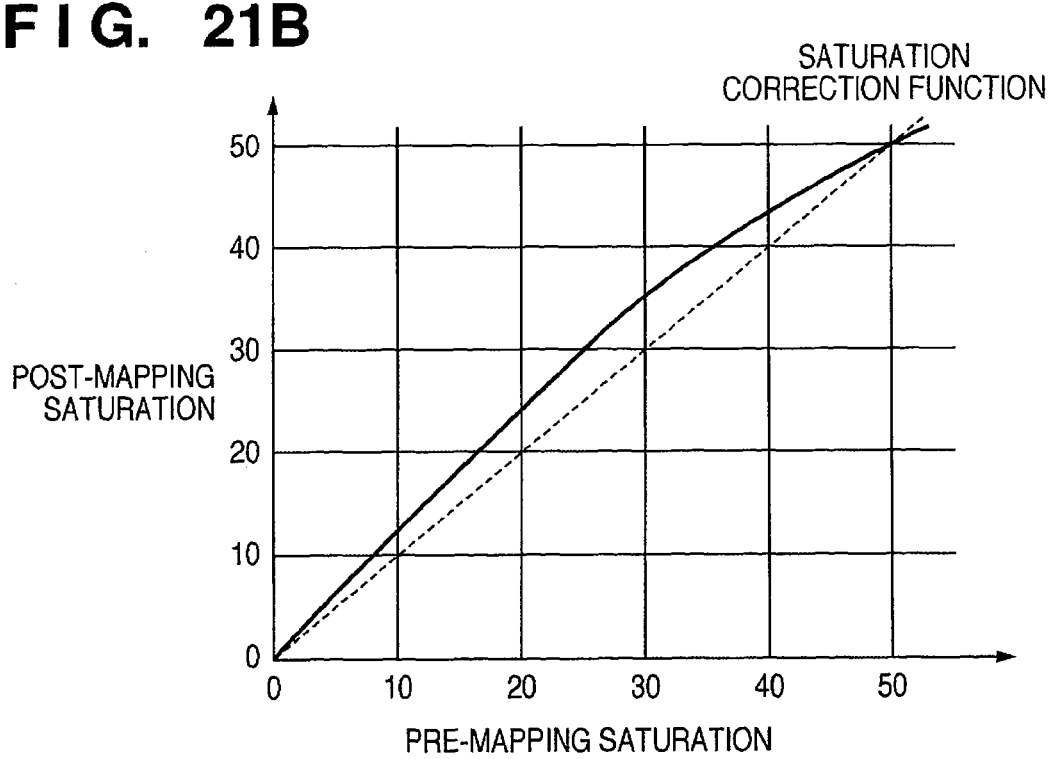
FIG. 21B is a diagram illustrating an example of an input/output function q(•) used for saturation adjustment mapping according to an embodiment of the present invention.

FIGS. 21A and 21B illustrate an example of the input/output function q(•). In FIG. 21A, while the high saturation portions are expanded, the saturation adjustment value c_low is 0.8, and thus the saturation is being suppressed in the low/medium saturation portions. Meanwhile, in FIG. 21B, while the high saturation portions are compressed, c_low is 1.2, and thus the saturation is being accentuated in the low/medium saturation portions.

Returning to FIG. 19, the pre-mapping saturation c_org of the color r is converted (mapped) using the input/output function q(•) found in step S1804, and a post-mapping saturation c_mod is found (S1905). The formula for this mapping is as follows.

$$c\_mod = q(c\_org)$$

After this, it is determined whether or not the abovementioned processing has been carried out on all grid points in the second intermediate gamut that correspond to the grid points in the RGB color space (S1906). If there are unprocessed grid points, the process returns to step S1901, where a grid point that has not yet been selected is selected, and the subsequent processing is repeated.

Through the abovementioned processing, the gamut 901 of the color monitor illustrated in FIG. 9 is thus mapped to the gamut 903 of the printer 109. In other words, the color correction LUT is completed.

According to the present embodiment as described thus far, setting common target gamut values for paper types, display media, and so on with differing output gamuts makes it possible to achieve automatically matched color reproduction. Furthermore, hue deviation can be corrected automatically in the input and output gamuts, thereby avoiding muddying of yellow or the like caused by contamination from other colors and making perceptually favorable color reproduction possible.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention can be implemented by a computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-134581, filed May 21, 2007, which is hereby incorporated by reference herein in its entirety.

What is claimed is:

1. A color mapping system for enabling a color processing method for generating mapping parameters for mapping a color signal of an input gamut to a color signal of an output gamut through gamut mapping based on the mapping parameters, the system comprising:
   a processor implementing the following steps:
      setting the output gamut corresponding to an output medium and a target gamut representing the target of gamut mapping carried out on the input gamut;
      setting constraining conditions for outputting a color of a specific hue in the set output gamut as a pure color;
      determining an evaluation function for evaluating a difference between the target gamut and results of gamut mapping performed on the input gamut using an initialized mapping parameters, based on the set constraining conditions and;
      determining the mapping parameters based on the evaluation function so that the difference is minimum.

2. The color processing method according to claim 1, further comprising:
   mapping the color signal of the input gamut to the set output gamut based on the determined mapping parameters.

3. The color processing method according to claim 2, wherein in the step of mapping, the color signal in the input gamut for the color of the specific hue for which the constraining conditions are set is mapped to a pure color line of the color of the specific hue in the set output gamut.

4. The color processing method according to claim 2,
   wherein in the step of mapping, the following is carried out for colors for which the constraining conditions are not set:
   the brightness and hue of the color signal of the input gamut is mapped to a first intermediate gamut;
   the brightness of the color signal of the first intermediate gamut is mapped to a second intermediate gamut; and
   the saturation of the color signal of the second intermediate gamut is mapped to the set output gamut.

5. The color processing method according to claim 1, wherein in the step of setting the constraining conditions, the color of the specific hue is set based on an instruction from a user.

6. The color processing method according to claim 1, wherein in the step of determining the evaluation function, the evaluation function is determined based on the constraining conditions.

7. The color processing method according to claim 1, wherein in the step of setting a target gamut, the target gamut is set based on a scene mode used at the time of output and that is set for the color signal.

8. The color processing method according to claim 1, further comprising setting the output gamut.

9. The color processing method according to claim 1, wherein the input and output gamuts are set to a color space that does not depend on the input and output color spaces.

10. A color processing apparatus, for generating mapping parameters for mapping a color signal of an input gamut to a color signal of an output gamut through gamut mapping based on the mapping parameters, comprising:
    a target gamut setting unit configured to set the output gamut corresponding to an output medium and a target gamut representing the target of gamut mapping carried out on the input gamut;
    a constraining condition setting unit configured to set constraining conditions for outputting a color of a specific hue in the set output gamut as a pure color;
    an evaluation function determining unit configured to determine an evaluation function for evaluating the difference between the target gamut and the results of gamut mapping performed on the input gamut using an initialed mapping parameters, based on the set constraining conditions;
    a mapping parameter determining unit configured to determine the mapping parameters based on the evaluation function so that the difference is minimum.

11. A computer-readable storage medium storing computer program that, when executed by a computer, causes the computer to execute the color processing method of claim 1.

* * * * *